United States Patent
You et al.

(10) Patent No.: US 10,548,128 B2
(45) Date of Patent: *Jan. 28, 2020

(54) METHOD AND USER EQUIPMENT FOR RECEIVING DOWNLINK SIGNAL AND METHOD AND BASE STATION FOR TRANSMITTING DOWNLINK SIGNAL

(71) Applicant: LG ELECTRONICS INC., Seoul (KR)

(72) Inventors: Hyangsun You, Seoul (KR); Dongyoun Seo, Seoul (KR); Yunjung Yi, Seoul (KR); Joonkui Ahn, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/033,763

(22) Filed: Jul. 12, 2018

(65) Prior Publication Data

US 2018/0324774 A1 Nov. 8, 2018

Related U.S. Application Data

(63) Continuation of application No. 15/232,500, filed on Aug. 9, 2016, now Pat. No. 10,057,897, which is a
(Continued)

(51) Int. Cl.
*H04W 72/04* (2009.01)
*H04B 7/26* (2006.01)
(Continued)

(52) U.S. Cl.
CPC ........ *H04W 72/042* (2013.01); *H04B 7/2656* (2013.01); *H04L 1/08* (2013.01);
(Continued)

(58) Field of Classification Search
CPC .......... H04W 72/042; H04W 72/0453; H04W 72/0406; H04W 72/0446; H04W 72/1289;
(Continued)

(56) References Cited

U.S. PATENT DOCUMENTS

2010/0290406 A1 11/2010 Miki et al.
2011/0007673 A1 1/2011 Ahn et al.
(Continued)

FOREIGN PATENT DOCUMENTS

CN 101500259 8/2009
CN 101594211 12/2009
(Continued)

OTHER PUBLICATIONS

U.S. Appl. No. 14/428,909 Office Action dated Dec. 18, 2015, 23 pages.
(Continued)

*Primary Examiner* — Curtis A Alia
(74) *Attorney, Agent, or Firm* — Lee Hong Degerman Kang Waimey

(57) ABSTRACT

The present invention provides: a base station for repeatedly transmitting a physical downlink control channel (PDCCH) during a first subframe bundle comprising a plurality of subframes, and transmitting a PDSCH related to the PDCCH; and user equipment for receiving the PDCCH and the PDSCH. The PDSCH can be transmitted to the user equipment starting from subframe n+k, which is the $k^{th}$ subframe after the last subframe n−1 in the first subframe bundle, wherein k is an integer bigger than 0. The first subframe bundle may begin from a predetermined or fixed position.

20 Claims, 19 Drawing Sheets

Related U.S. Application Data continuation of application No. 14/428,909, filed as application No. PCT/KR2014/000387 on Jan. 14, 2014, now Pat. No. 9,485,763.

(60) Provisional application No. 61/752,444, filed on Jan. 14, 2013, provisional application No. 61/810,678, filed on Apr. 10, 2013, provisional application No. 61/822,416, filed on May 12, 2013, provisional application No. 61/862,518, filed on Aug. 6, 2013, provisional application No. 61/883,214, filed on Sep. 27, 2013, provisional application No. 61/886,673, filed on Oct. 4, 2013.

(51) Int. Cl.

| | | |
|---|---|---|
| *H04L 1/18* | (2006.01) | |
| *H04L 1/08* | (2006.01) | |
| *H04L 5/00* | (2006.01) | |
| *H04L 27/26* | (2006.01) | |
| *H04W 4/70* | (2018.01) | |

(52) U.S. Cl.
CPC ............ *H04L 1/189* (2013.01); *H04L 1/1858* (2013.01); *H04L 5/0053* (2013.01); *H04L 5/0092* (2013.01); *H04L 27/2602* (2013.01); *H04W 4/70* (2018.02); *H04W 72/0446* (2013.01); *H04L 5/0055* (2013.01)

(58) Field of Classification Search
CPC . H04W 72/1278; H04W 24/02; H04W 16/14; H04W 74/006
See application file for complete search history.

(56) References Cited

U.S. PATENT DOCUMENTS

| | | |
|---|---|---|
| 2012/0113925 A1 | 5/2012 | Ahn et al. |
| 2012/0269103 A1 | 10/2012 | Papasakellariou et al. |
| 2012/0269151 A1 | 10/2012 | Lee et al. |
| 2012/0300655 A1 | 11/2012 | Lee et al. |
| 2013/0235808 A1 | 9/2013 | Earnshaw et al. |
| 2015/0237644 A1 | 8/2015 | Golitschek Edler von Elbwart et al. |
| 2015/0245323 A1 | 8/2015 | You et al. |
| 2016/0143017 A1* | 5/2016 | Yang ..................... H04L 1/1812 370/329 |
| 2016/0353420 A1 | 12/2016 | You et al. |

FOREIGN PATENT DOCUMENTS

| | | |
|---|---|---|
| WO | 2014025381 | 2/2014 |
| WO | 2014055878 | 4/2014 |

OTHER PUBLICATIONS

Catt, "Analysis of coverage improvement for low-cost MTC LTE UEs," 3GPP TSG RAN WG1 Meeting #71, R1-124772, Nov. 2012, 7 pages.
Catt, "Analysis of coverage improvement for low-cost MTC LTE UEs," 3GPP TSG RAN WG1 Meeting #71, R1-125247, Nov. 2012, 8 pages.
LG Electronics, "Discussion on Coverage Enhancement for a low-cost MTC UE," 3GPP TSG RAN WG1 #71, R1-124993, Nov. 2012, 6 pages.
Sony Europe Ltd., "Introduction to coverage aspects of low cost MTC UEs," 3GPP TSG RAN WG1 #71, R1-125038, Nov. 2012, 6 pages.
PCT International Application No. PCT/KR2014/000387, Written Opinion of the International Searching Authority dated Apr. 29, 2014 32 page.
State Intellectual Property Office of the People's Republic of China Application Serial No. 201480003251.3, Office Action dated Jul. 14, 2017, 10 pages.
U.S. Appl. No. 15/232,500, Office Action dated Sep. 13, 2017, 25 pages.
European Patent Office Application No. 14737787.3, Search Report dated Jul. 18, 2016, 8 pages.
Catt, "Analysis of coverage improvement for low-cost MTC LTE UEs", R1-124772, 3GPP TSG RAN WG1 Meeting #71, Nov. 2012, 6 pages.
Samsung, "Coverage improvement for low-cost MTC UEs based on LTE", R1-125286, 3GPP TSG RAN WG1 #71, Nov. 2012, 4 pages.
LG Electronics, "Cell Acquisition and Reference Signals for Coverage Limiting MTC UEs", R1-130263, Feb. 2013, 7 pages.

* cited by examiner

[p] RE occupied by CRS of port p ( p∈0, p∈0,1 or p∈0,1,2,3 )

▨ RE occupied by UE-RS of port(s) p ( p∈7, p∈8, p∈7,8 or p∈7,8,11,13 )

▧ RE occupied by UE-RS of port(s) p ( p∈9, p∈10, p∈9,10 or p∈9,10,12,14 )

FIG. 12
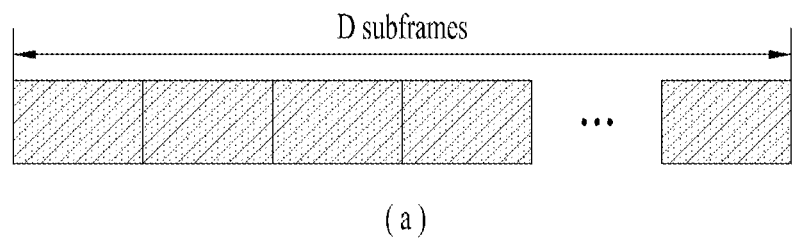
(a)
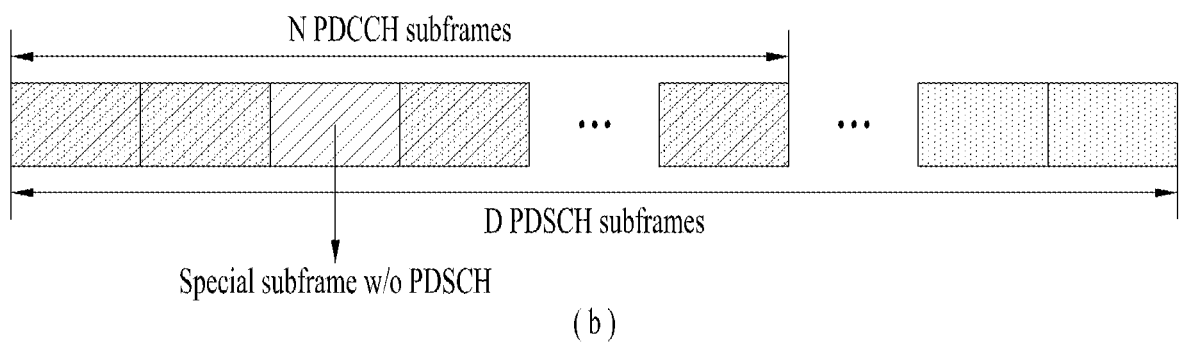
(b)

FIG. 14
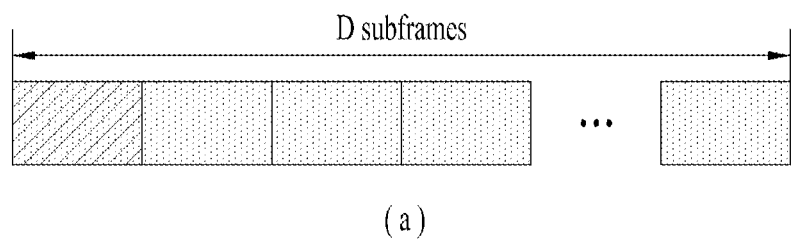
(a)
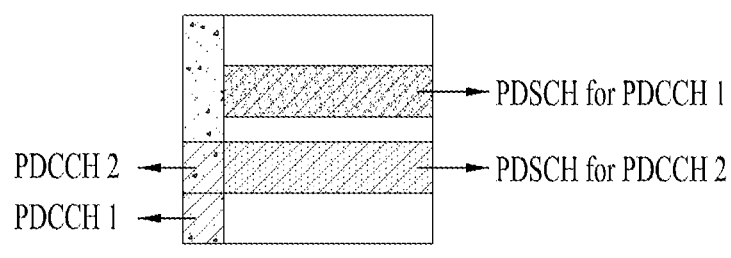
(b)

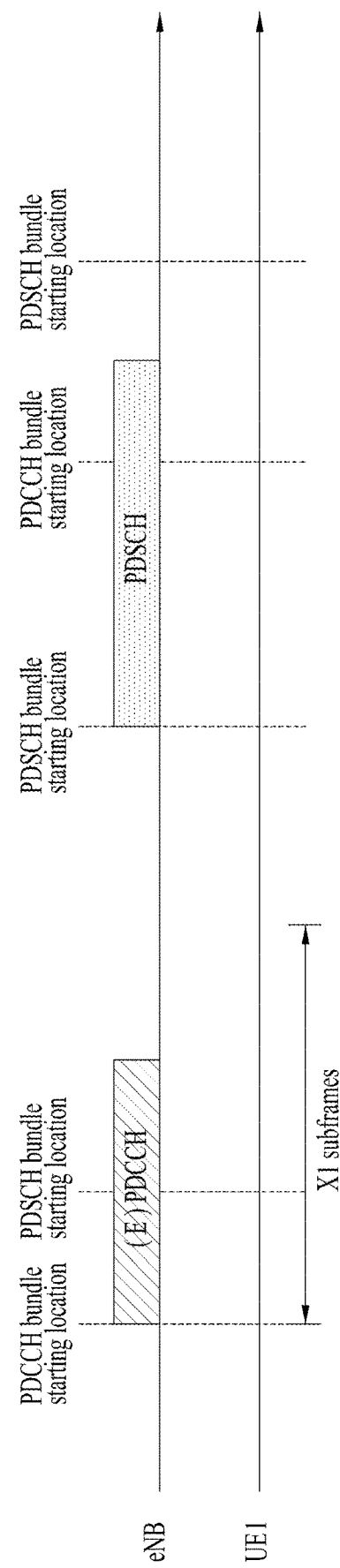

METHOD AND USER EQUIPMENT FOR RECEIVING DOWNLINK SIGNAL AND METHOD AND BASE STATION FOR TRANSMITTING DOWNLINK SIGNAL

CROSS-REFERENCE TO RELATED APPLICATIONS

This application is a continuation of U.S. patent application Ser. No. 15/232,500, filed on Aug. 9, 2016, now U.S. Pat. No. 10,057,897, which is a continuation of U.S. patent application Ser. No. 14/428,909, filed on Mar. 17, 2015, now U.S. Pat. No. 9,485,763, which is the National Stage filing under 35 U.S.C. 371 of International Application No. PCT/KR2014/000387, filed on Jan. 14, 2014, which claims the benefit of U.S. Provisional Application No. 61/752,444, filed on Jan. 14, 2013, 61/810,678, filed on Apr. 10, 2013, 61/822,416, filed on May 12, 2013, 61/862,518, filed on Aug. 6, 2013, 61/883,214, filed on Sep. 27, 2013 and 61/886,673, filed Oct. 4, 2013, the contents of which are all hereby incorporated by reference herein in their entirety.

TECHNICAL FIELD

The present invention relates to a wireless communication system and, more particularly, to a method for transmitting or receiving a signal and an apparatus therefor.

TECHNICAL FIELD

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

DETAILED DESCRIPTION OF THE INVENTION

Technical Problems

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

The technical objects that can be achieved through the present invention are not limited to what has been particularly described hereinabove and other technical objects not described herein will be more clearly understood by persons skilled in the art from the following detailed description.

Technical Solutions

In an aspect of the present invention, provided herein is a method for receiving a downlink signal by a user equipment, including performing repetitive reception of a physical downlink control channel (PDCCH) during a first subframe bundle including multiple subframes.

In another aspect of the present invention, provided herein is a user equipment for receiving a downlink signal, including a radio frequency (RF) unit and a processor configured to control the RF unit, wherein the processor controls the RF unit to perform repetitive reception of a physical downlink control channel (PDCCH) during a first subframe bundle including multiple subframes.

In still another aspect of the present invention, provided herein is a method for transmitting a downlink signal by a user equipment, including performing repetitive transmission of a physical downlink control channel (PDCCH) during a first subframe bundle including multiple subframes.

In a further aspect of the present invention, provided herein is a base station for transmitting a downlink signal, including a radio frequency (RF) unit and a processor configured to control the RF unit, wherein the processor controls the RF unit to perform repetitive transmission of a physical downlink control channel (PDCCH) during a first subframe bundle including multiple subframes.

In each aspect of the present invention, transmission of a physical downlink shared channel (PDSCH) associated with the PDCCH may be performed starting from a subframe n+k corresponding to a k-th subframe after a last subframe n−1 of the first subframe bundle, wherein k is an integer greater than 0.

In each aspect of the present invention, a start subframe of the first subframe bundle may be started at a preset location or a fixed location.

In each aspect of the present invention, a size of the first subframe bundle may be a preset value or a fixed value.

In each aspect of the present invention, repetitive transmission of the PDSCH may be performed during a second subframe bundle starting from the subframe n+k.

In each aspect of the present invention, information indicating at least one of a transmission period of the second subframe bundle, an offset in the transmission period of the second subframe bundle, and a size of the second subframe bundle may be transmitted to the user equipment.

In each aspect of the present invention, transmission of a physical broadcast channel (PBCH) may be further performed.

In each aspect of the present invention, the user equipment may assume that the PDSCH is not transmitted in a resource of the PBCH.

In each aspect of the present invention, information about a start location of a third subframe bundle for repetitive transmission of acknowledgement (ACK)/negative acknowledgement (NACK) information for the PDSCH and a size of the third subframe bundle may be further transmitted to the user equipment.

The above technical solutions are merely some parts of the embodiments of the present invention and various embodiments into which the technical features of the present invention are incorporated can be derived and understood by persons skilled in the art from the following detailed description of the present invention.

Advantageous Effect

According to the present invention, uplink/downlink signals can be efficiently transmitted/received. Therefore, overall throughput of a radio communication system can be improved.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

FIG. 12 illustrates still another signal transmission/reception method according to embodiment A of the present invention.

FIG. 14 illustrates a signal transmission/reception method according to embodiment C of the present invention.

FIG. 20 illustrates a signal transmission/reception method according to embodiment G of the present invention.

MODE FOR CARRYING OUT THE INVENTION

Figure 1:
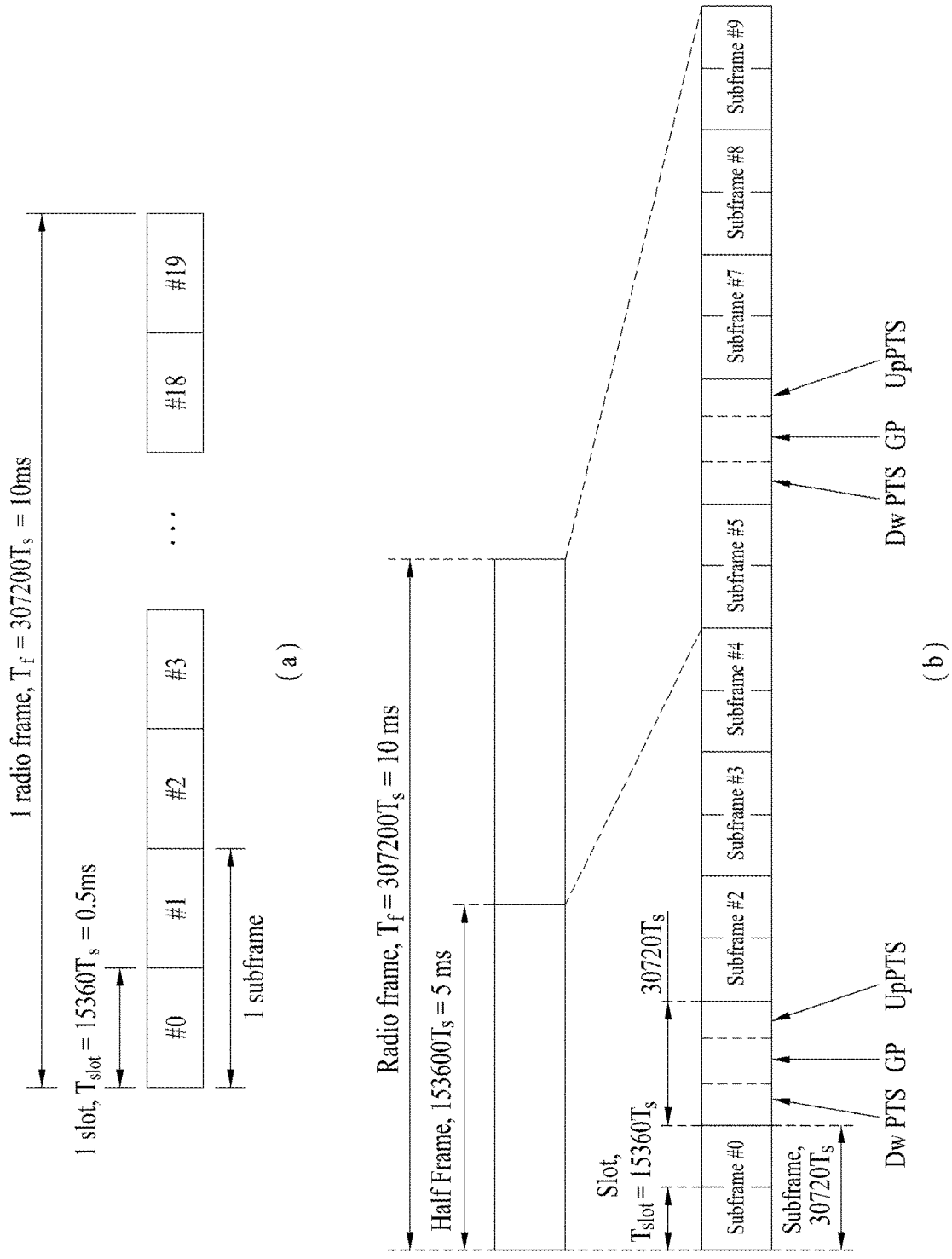
FIG. 1 illustrates the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna, or an antenna group. A node may be referred to as a point. In the multi-node system, the same cell identity (ID) or different cell IDs may be used to transmit/receive signals to/from a plurality of nodes. If the plural nodes have the same cell ID, each of the nodes operates as a partial antenna group of one cell. If the nodes have different cell IDs in the multi-node system, the multi-node system may be regarded as a multi-cell (e.g. a macro-cell/femto-cell/pico-cell) system. If multiple cells formed respectively by multiple nodes are configured in an overlaid form according to coverage, a network formed by the multiple cells is referred to as a multi-tier network. A cell ID of an RRH/RRU may be the same as or different from a cell ID of an eNB. When the RRH/RRU and the eNB use different cell IDs, both the RRH/RRU and the eNB operate as independent eNBs.

In the multi-node system, one or more eNBs or eNB controllers connected to multiple nodes may control the nodes such that signals are simultaneously transmitted to or received from a UE through some or all nodes. While there is a difference between multi-node systems according to the nature of each node and implementation form of each node, multi-node systems are discriminated from single node systems (e.g. a centralized antenna system (CAS), conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes may be applied to various types of multi-node systems. For example, a node refers to an antenna group spaced apart from another node by a predetermined distance or more, in general. However, embodiments of the present invention, which will be described below, may even be applied to a case in which a node refers to an arbitrary antenna group irrespective of node interval. In the case of an eNB including an X-pole (cross-polarized) antenna, for example, the embodiments of the preset invention are applicable on the assumption that the eNB controls a node composed of an H-pole antenna and a node composed of a V-pole antenna.

A communication scheme through which signals are transmitted/received via a plurality of transmit (Tx)/receive (Rx) nodes, signals are transmitted/received via at least one node selected from a plurality of Tx/Rx nodes, or a node transmitting a DL signal is discriminated from a node transmitting a UL signal is called multi-eNB MIMO or coordinated multi-point transmission/reception (CoMP). Coordinated transmission schemes from among CoMP communication schemes may be broadly categorized into joint processing (JP) and scheduling coordination. The former may be divided into joint transmission (JT)/joint reception (JR) and dynamic point selection (DPS) and the latter may be divided into coordinated scheduling (CS) and coordinated beamforming (CB). DPS may be called dynamic cell selection (DCS). When JP is performed, a wider variety of communication environments can be formed, compared to other CoMP schemes. JT refers to a communication scheme by which a plurality of nodes transmits the same stream to a UE and JR refers to a communication scheme by which a plurality of nodes receive the same stream from the UE. The UE/eNB combine signals received from the plurality of nodes to restore the stream. In the case of JT/JR, signal transmission reliability can be improved according to transmit diversity since the same stream is transmitted to/from a plurality of nodes. In JP, DPS refers to a communication scheme by which a signal is transmitted/received through a node selected from a plurality of nodes according to a specific rule. In the case of DPS, signal transmission reliability can be improved because a node having a good channel state between the node and the UE is selected as a communication node.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. The UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Meanwhile, a 3GPP LTE/LTE-A system uses the concept of a cell in order to manage radio resources and a cell associated with the radio resources is distinguished from a cell of a geographic region.

Recently, to use a wider frequency band in recent wireless communication systems, introduction of carrier aggregation (or BW aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal subcarriers on a single carrier frequency to perform DL or UL communication. Hereinbelow, each of carriers aggregated by carrier aggregation will be referred to as a component carrier (CC). The "cell" associated with the radio resources is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

In addition, in the present invention, a PBCH/(e)PDCCH/PDSCH/PUCCH/PUSCH region refers to a time-frequency resource region to which PBCH/(e)PDCCH/PDSCH/PUCCH/PUSCH has been mapped or may be mapped.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/TRS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region. In the present invention, both a DMRS and a UE-RS refer to RSs for demodulation and, therefore, the terms DMRS and UE-RS are used to refer to RSs for demodulation.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A.

Referring to FIG. 1, a 3GPP LTE/LTE-A radio frame is 10 ms (307,200 $T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |

TABLE 1-continued

| Uplink-downlink config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 2:
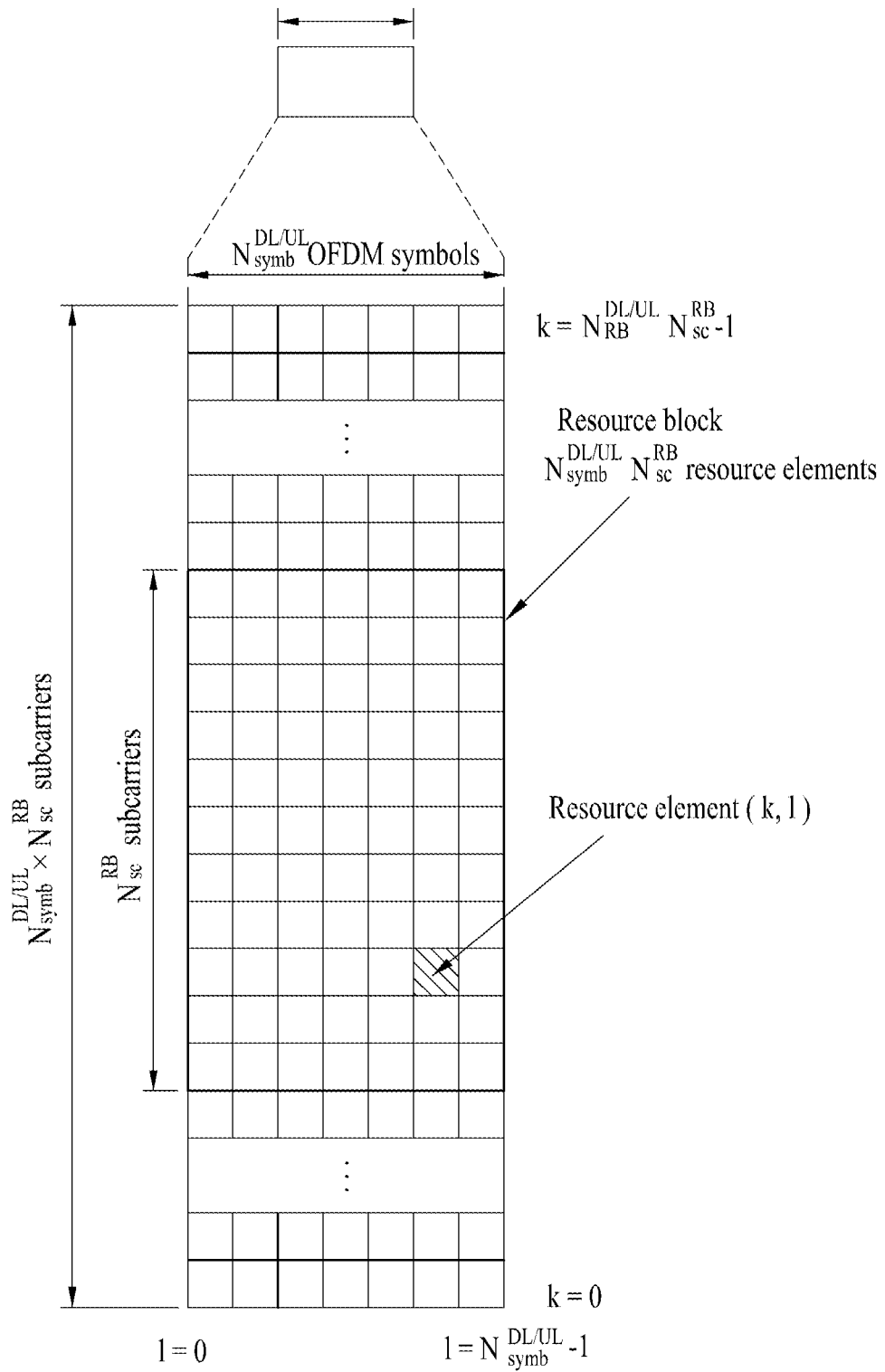
FIG. 2 illustrates the structure of a downlink (DL)/uplink (UL) slot in a wireless communication system.

FIG. 2 illustrates the structure of a DL/UL slot structure in a wireless communication system. In particular, FIG. 2 illustrates the structure of a resource grid of a 3GPP LTE/LTE-A system. One resource grid is defined per antenna port.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB} * N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB} * N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb} * N^{RB}_{sc}$ REs. Each RE within a resource grid may be uniquely defined by an index pair (k, l) within one slot k is an index ranging from 0 to $N^{DL/UL}_{RB} * N^{RB}_{sc}-1$ in the frequency domain, and l is an index ranging from 0 to $N^{DL/UL}_{symb}-1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. 12) consecutive subcarriers in the frequency domain. Accordingly, one PRB is configured with $N^{DL/UL}_{symb} * N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

Figure 3:
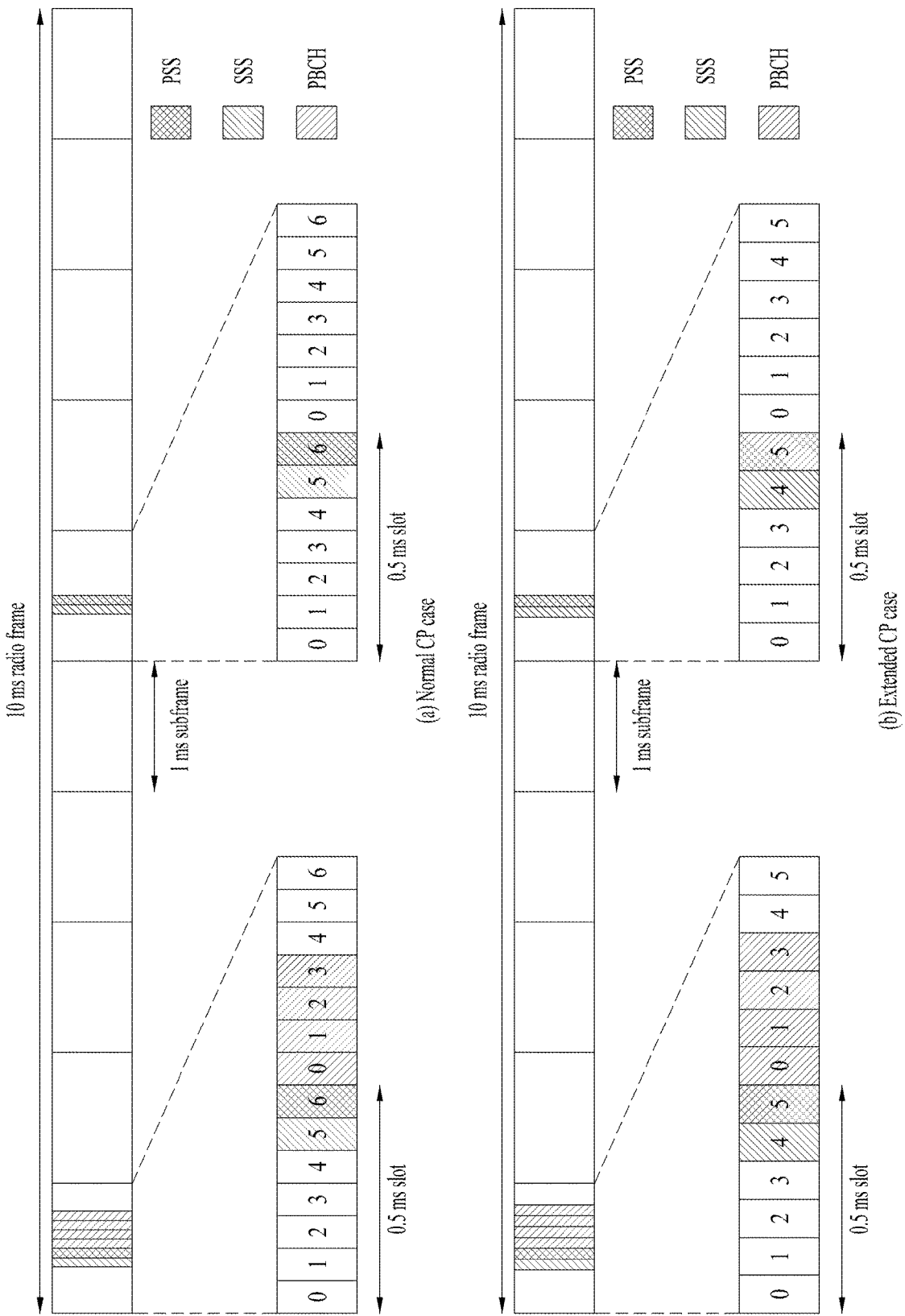
FIG. 3 illustrates a radio frame structure for transmission of a synchronization signal (SS).

FIG. 3 illustrates a radio frame structure for transmission of a synchronization signal (SS). Specifically, FIG. 3 illustrates a radio frame structure for transmission of an SS and a PBCH in frequency division duplex (FDD), wherein FIG. 3(a) illustrates transmission locations of an SS and a PBCH in a radio frame configured as a normal cyclic prefix (CP) and FIG. 3(b) illustrates transmission locations of an SS and a PBCH in a radio frame configured as an extended CP.

If a UE is powered on or newly enters a cell, the UE performs an initial cell search procedure of acquiring time and frequency synchronization with the cell and detecting a physical cell identity $N^{cell}_{ID}$ of the cell. To this end, the UE may establish synchronization with the eNB by receiving synchronization signals, e.g. a primary synchronization signal (PSS) and a secondary synchronization signal (SSS), from the eNB and obtain information such as a cell identity (ID).

An SS will be described in more detail with reference to FIG. 3. An SS is categorized into a PSS and an SSS. The PSS is used to acquire time-domain synchronization of OFDM symbol synchronization, slot synchronization, etc. and/or frequency-domain synchronization and the SSS is used to acquire frame synchronization, a cell group ID, and/or CP configuration of a cell (i.e. information as to whether a normal CP is used or an extended CP is used). Referring to FIG. 3, each of a PSS and an SSS is transmitted on two OFDM symbols of every radio frame. More specifically, SSs are transmitted in the first slot of subframe 0 and the first slot of subframe 5, in consideration of a global system for mobile communication (GSM) frame length of 4.6 ms for facilitation of inter-radio access technology (inter-RAT) measurement. Especially, a PSS is transmitted on the last OFDM symbol of the first slot of subframe 0 and on the last OFDM symbol of the first slot of subframe 5 and an SSS is transmitted on the second to last OFDM symbol of the first slot of subframe 0 and on the second to last OFDM symbol of the first slot of subframe 5. A boundary of a corresponding radio frame may be detected through the SSS. The PSS is transmitted on the last OFDM symbol of a corresponding slot and the SSS is transmitted on an OFDM symbol immediately before an OFDM symbol on which the PSS is transmitted. A transmit diversity scheme of an SS uses only a single antenna port and standards therefor are not separately defined. That is, a single antenna port transmission scheme or a transmission scheme transparent to a UE (e.g. precoding vector switching (PVS), time switched transmit diversity (TSTD), or cyclic delay diversity (CDD)) may be used for transmit diversity of an SS.

An SS may represent a total of 504 unique physical layer cell IDs by a combination of 3 PSSs and 168 SSSs. In other words, the physical layer cell IDs are divided into 168 physical layer cell ID groups each including three unique IDs so that each physical layer cell ID is a part of only one physical layer cell ID group. Accordingly, a physical layer cell ID $N^{cell}_{ID}$ ($=3N^{(1)}_{ID}+N^{(2)}_{ID}$) is uniquely defined as number $N^{(1)}_{ID}$ in the range of 0 to 167 indicating a physical layer cell ID group and number $N^{(2)}_{ID}$ from 0 to 2 indicating the physical layer ID in the physical layer cell ID group. A UE may be aware of one of three unique physical layer IDs by detecting the PSS and may be aware of one of 168 physical layer cell IDs associated with the physical layer ID by detecting the SSS. A length-63 Zadoff-Chu (ZC) sequence is defined in the frequency domain and is used as the PSS.

Referring to FIG. 3, upon detecting a PSS, a UE may discern that a corresponding subframe is one of subframe 0 and subframe 5 because the PSS is transmitted every 5 ms but the UE cannot discern whether the subframe is subframe 0 or subframe 5. Accordingly, the UE cannot recognize the boundary of a radio frame only by the PSS. That is, frame synchronization cannot be acquired only by the PSS. The UE detects the boundary of a radio frame by detecting an SSS which is transmitted twice in one radio frame with different sequences.

Thus, for cell search/re-search, the UE may receive the PSS and the SSS from the eNB to establish synchronization with the eNB and acquire information such as a cell ID. Thereafter, the UE may receive broadcast information in a cell managed by the eNB over a PBCH.

The message content of the PBCH are expressed in a master information block (MIB) in a radio resource control (RRC) layer. Specifically, the message content of the PBCH is shown in Table 3.

TABLE 3

-- ASN1START
MasterInformationBlock ::=    SEQUENCE {
    dl-Bandwidth                  ENUMERATED {
                                      n6, n15, n25, n50, n75, n100},
    phich-Config                  PHICH-Config,
    systemFrameNumber             BIT STRING (SIZE (8)),
    spare                         BIT STRING (SIZE (10))
}
-- ASN1STOP As shown in Table 4, the MIB includes DL bandwidth (BW), PHICH configuration, and a system frame number (SFN). For example, among the parameters of the MIB, the parameter dl-Bandwidth is a parameter indicating the number of RBs $N_{RB}$ on DL. This parameter may indicate a DL system bandwidth in a manner that n6 corresponds to 6 RBs, and n15 corresponds to 15 RBs. Among the parameters of the MIB, the parameter sytemFrameNumber defines 8 most significant bits of an SFN. The two least significant bits of the SFN may be implicitly obtained by decoding the PBCH. The timing of 40 ms PBCH TTI indicates two least significant bits. For example, in the 40 ms PBCH TTI, the first radio frame indicates 00, the second radio frame indicates 01, the third radio frame indicates 10, and the last radio frame indicates 11. Accordingly, the UE may be explicitly aware of information about the DL BW, SFN, and PHICH configuration by receiving the MIB. Meanwhile, information which may be implicitly recognized by the UE through reception of the PBCH includes the number of transmit antenna ports of the eNB. Information about the number of transmit antennas of the eNB is implicitly signaled by masking (e.g. XOR operation) a sequence corresponding to the number of transmit antennas to a 16-bit cyclic redundancy check (CRC) used for error detection of the PBCH. For example, masking sequences shown below may be used according to the number of antennas.

TABLE 4

| Number of transmit antenna ports at eNode-B | PBCH CRC mask $<x_{ant,0}, x_{ant,1}, \ldots, x_{ant,15}>$ |
|---|---|
| 1 | <0, 0, 0, 0, 0, 0, 0, 0, 0, 0, 0, 0, 0, 0, 0, 0> |
| 2 | <1, 1, 1, 1, 1, 1, 1, 1, 1, 1, 1, 1, 1, 1, 1, 1> |
| 4 | <0, 1, 0, 1, 0, 1, 0, 1, 0, 1, 0, 1, 0, 1, 0, 1> |

The PBCH is mapped to REs after cell-specific scrambling, modulation, layer mapping, and precoding are applied thereto.

FIG. 3 illustrates exemplary mapping based on one radio frame and, in fact, an encoded PBCH is mapped to 4 subframes substantially for 40 ms. The time of 40 ms is blind-detected and explicit signalling about 40 ms is not separately present. The PBCH is mapped to 4 OFDM symbols and 72 subcarriers in one subframe. The PBCH is not mapped to REs in which RSs for 4 transmit antennas are located regardless of the number of actual transmit antennas of the eNB. For reference, even in the frame structure applied to TDD, illustrated in FIG. 1(b), the PBCH is mapped to 4 subframes during 40 ms and is mapped to 4 OFDM symbols and 72 subcarriers in one subframe. In TDD, the PBCH may be located on OFDM symbols 0 to 3 of slot 1 (the rear slot of subframe 0) and slot 11 (the rear slot of subframe 5) among slots 0 to 19 of a radio frame.

When a UE accesses an eNB or a cell for the first time or does not have a radio resource allocated for transmission of a signal to the eNB or the cell, the UE may perform a random access procedure. To perform the random access procedure, the UE may transmit a specific sequence over a PRACH as a random access preamble, and receive a response message for the random access preamble over a PDCCH and/or a PDSCH corresponding to the PDCCH. Thereby, a radio resource necessary for signal transmission may be allocated to the UE. In the random access procedure, a UE identifier may be configured for the UE. For example, a cell radio network temporary identifier (C-RNTI) may identify the UE in a cell, and may be temporary, semi-persistent or permanent. A temporary C-RNTI may be allocated in a temporary access process, and may become a permanent C-RNTI after contention is resolved. A semi-persistent C-RNTI is used to schedule semi-persistent resources through a PDCCH. The semi-persistent C-RNTI is also called a semi-persistent scheduling (SPS) C-RNTI. A permanent C-RNTI has a C-RNTI value allocated after contention is resolved in the random access procedure, and is used to schedule a dynamic resource.

Figure 4:
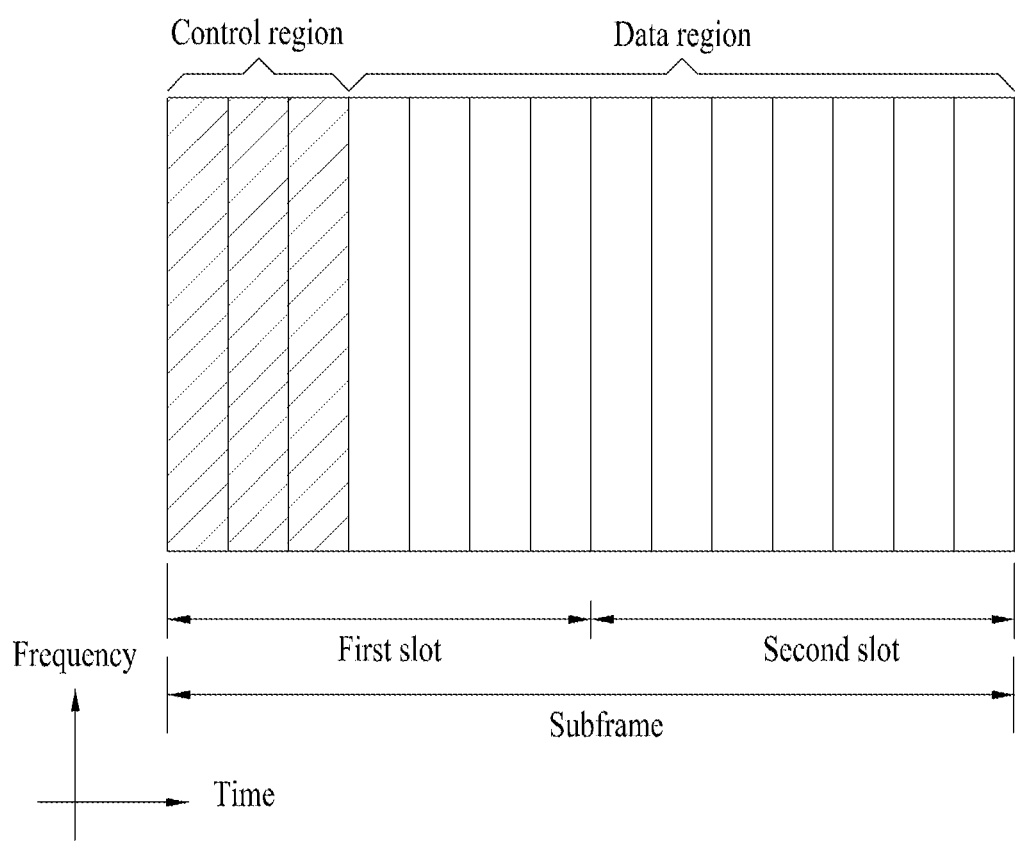
FIG. 4 illustrates the structure of a DL subframe used in a wireless communication system.

FIG. 4 illustrates the structure of a DL subframe used in a wireless communication system.

A DL subframe is divided into a control region and a data region in the time domain. Referring to FIG. 4, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel in a subframe. The PHICH carries a HARQ (Hybrid Automatic Repeat Request) ACK/NACK (acknowledgment/negative-acknowledgment) signal as a response to UL transmission.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at the bit level.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, one CCE corresponds to nine resource element groups (REGs), and one REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH). The number of DCI formats and DCI bits is determined in accordance with the number of CCEs. For example, the PCFICH and PHICH include 4 REGs and 3 REGs, respectively. Assuming that the number of REGs not allocated to the PCFICH or the PHICH is $N_{REG}$, the number of available CCEs in a DL subframe for PDCCH(s) in a system is numbered from 0 to $N_{CCE}-1$, where $N_{CCE}=\text{floor}(N_{REG}/9)$.

A PDCCH format and the number of DCI bits are determined in accordance with the number of CCEs. The CCEs are numbered and consecutively used. To simplify the decoding process, a PDCCH having a format including n CCEs may be initiated only on CCEs assigned numbers corresponding to multiples of n. For example, a PDCCH including n consecutive CCEs may be initiated only on CCEs satisfying 'i mod n=0'. Herein, i denotes a CCE index (or a CCE number).

The number of CCEs used for transmission of a specific PDCCH is determined by the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

In a 3GPP LTE/LTE-A system, a set of CCEs on which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined as the SS. SSs for respective PDCCH formats may have different sizes and a dedicated SS and a common SS are defined. The dedicated SS is a UE-specific SS (USS) and is configured for each individual UE. The common SS (CSS) is configured for a plurality of UEs. The following table shows aggregation levels for defining SSs.

TABLE 5

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

The eNB transmits an actual PDCCH (DCI) on a PDCCH candidate in a search space and the UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) 'A' and information about data transmitted using a radio resource 'B' (e.g. frequency location) and using transport format information 'C' (e.g. transmission block size, modulation scheme, coding information, etc.) is transmitted in a specific DL subframe. Then, the UE monitors the PDCCH using RNTI information thereof. The UE having the RNTI 'A' receives the PDCCH and receives the PDSCH indicated by 'B' and 'C' through information of the received PDCCH.

In order for the receiving device to restore a signal transmitted by the transmitting device, an RS for estimating a channel between the receiving device and the transmitting device is needed. RSs may be categorized into RSs for demodulation and RSs for channel measurement. CRSs defined in the 3GPP LTE system can be used for both demodulation and channel measurement. In a 3GPP LTE-A system, a UE-specific RS (hereinafter, a UE-RS) and a CSI-RS are further defined in addition to a CRS. The UE-RS is used to perform demodulation and the CSI-RS is used to derive CSI. Meanwhile, RSs are divided into a dedicated RS (DRS) and a common RS (CRS) according to whether a UE recognizes presence thereof. The DRS is known only to a specific UE and the CRS is known to all UEs. Among RSs defined in the 3GPP LTE-A system, the cell-specific RS may be considered a sort of the common RS and the DRS may be considered a sort of the UE-RS.

For reference, demodulation may be viewed as a part of the decoding process. In the present invention, the terms demodulation and decoding are used interchangeably.

Figure 5:
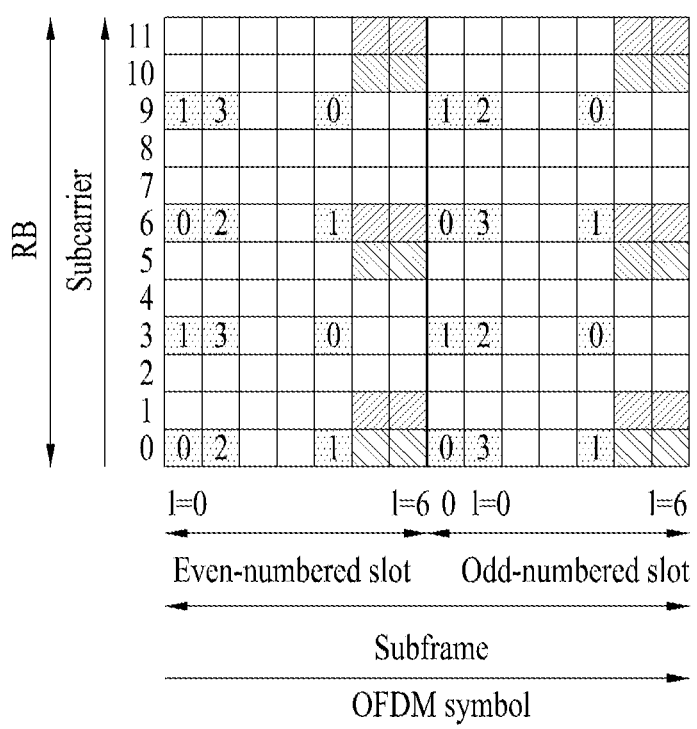
FIG. 5 illustrates configuration of cell specific reference signals (CRSs) and user specific reference signals (UE-RS).

FIG. 5 illustrates configuration of cell specific reference signals (CRSs) and user specific reference signals (UE-RS).

In particular, FIG. 5 shows REs occupied by the CRS(s) and UE-RS(s) on an RB pair of a subframe having a normal CP.

In an existing 3GPP system, since CRSs are used for both demodulation and measurement, the CRSs are transmitted in all DL subframes in a cell supporting PDSCH transmission and are transmitted through all antenna ports configured at an eNB.

A UE may measure CSI using the CRSs and demodulate a signal received on a PDSCH in a subframe including the CRSs. That is, the eNB transmits the CRSs at predetermined locations in each RB of all RBs and the UE performs channel estimation based on the CRSs and detects the PDSCH. For example, the UE may measure a signal received on a CRS RE and detect a PDSCH signal from an RE to which the PDSCH is mapped using the measured signal and using the ratio of reception energy per CRS RE to reception energy per PDSCH mapped RE. However, when the PDSCH is transmitted based on the CRSs, since the eNB should transmit the CRSs in all RBs, unnecessary RS overhead occurs. To solve such a problem, in a 3GPP LTE-A system, a UE-specific RS (hereinafter, UE-RS) and a CSI-RS are further defined in addition to a CRS. The UE-RS is used for demodulation and the CSI-RS is used to derive CSI. The UE-RS is one type of DRS. Since the UE-RS and the CRS are used for demodulation, the UE-RS and the CRS may be regarded as demodulation RSs in terms of usage. Since the CSI-RS and the CRS are used for channel measurement or channel estimation, the CSI-RS and the CRS may be regarded as measurement RSs.

UE-RSs are transmitted on antenna port(s) p=5, p=7, p=8 or p=7, 8, . . . , v+6 for PDSCH transmission, where v is the number of layers used for the PDSCH transmission. UE-RSs are present and are a valid reference for PDSCH demodulation only if the PDSCH transmission is associated with the corresponding antenna port. UE-RSs are transmitted only on RBs to which the corresponding PDSCH is mapped. That is, the UE-RSs are configured to be transmitted only on RB(s) to which a PDSCH is mapped in a subframe in which the PDSCH is scheduled unlike CRSs configured to be transmitted in every subframe irrespective of whether the PDSCH is present. Accordingly, overhead of the RS may be lowered compared to that of the CRS.

Figure 7:
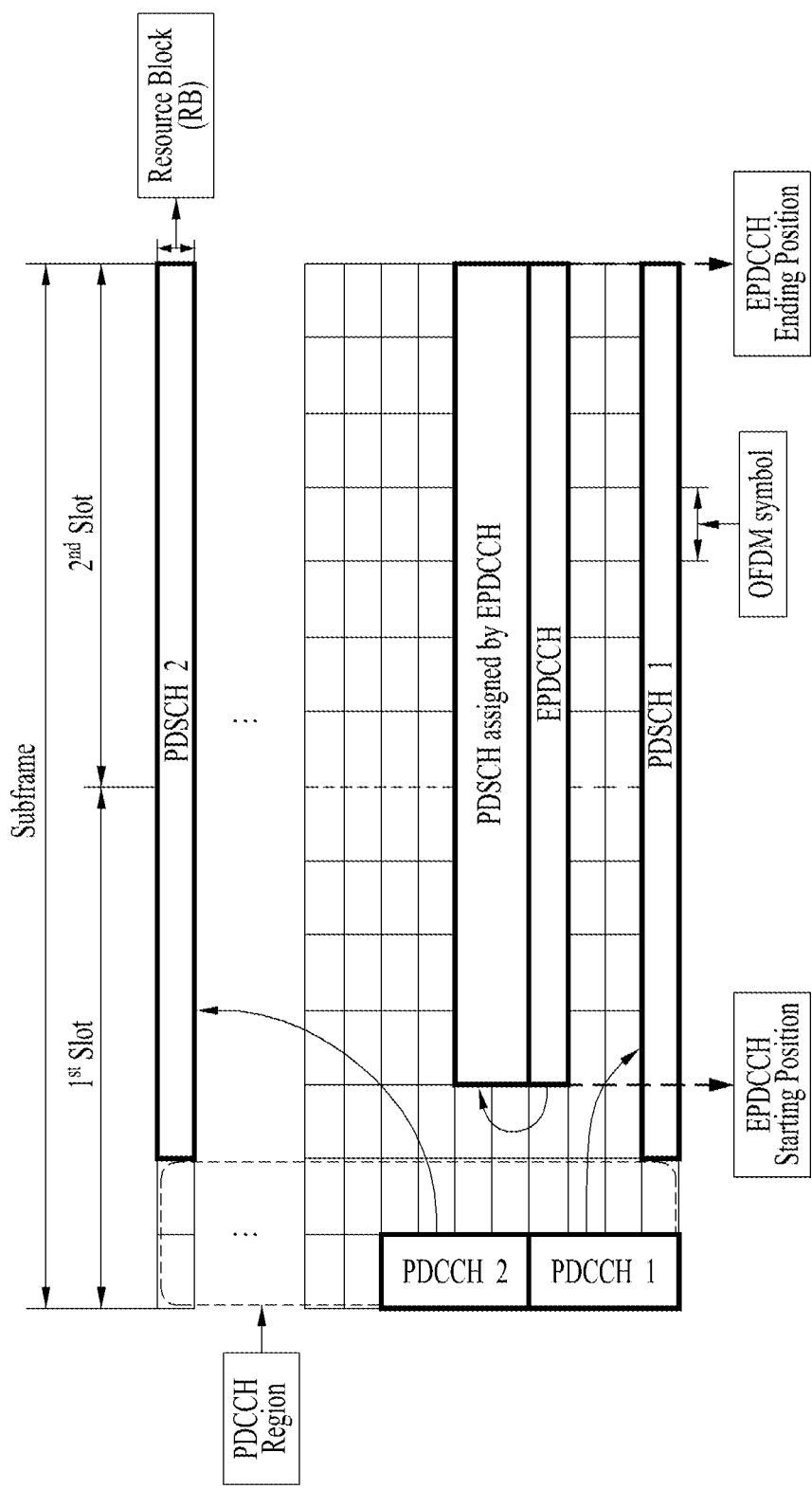
FIG. 7 illustrates a physical downlink control channel (PDCCH) or an enhanced PDCCH (EPDCCH), and a data channel scheduled by PDCCH/EPDCCH.

In the 3GPP LTE-A system, the UE-RSs are defined in a PRB pair. Referring to FIG. 7, in a PRB having frequency-domain index $n_{PRB}$ assigned for PDSCH transmission with respect to p=7, p=8, or p=7, 8, . . . , v+6, a part of UE-RS sequence r(m) is mapped to complex-valued modulation symbols $a_{k,l}^{(p)}$ in a subframe according to the following equation.

$$a_{k,l}^{(p)} = w_p(l') \cdot r(3 \cdot l' \cdot N_{RB}^{max,DL} + 3 \cdot n_{PRB} + m') \quad \text{[Equation 1]}$$

where $w_p(i)$, l', m' are given as follows.

【수학식 2】

$$w_p(i) = \begin{cases} \bar{w}_p(i) & (m' + n_{PRB}) \bmod 2 = 0 \\ \bar{w}_p(3-i) & (m' + n_{PRB}) \bmod 2 = 1 \end{cases}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

-continued $$l = \begin{cases} l' \bmod 2 + 2 & \text{if in a special subframe} \\ & \text{with configuration} \\ & \text{3, 4, or 8 (see Table 2)} \\ l' \bmod 2 + & \text{if in a special subframe} \\ 2 + 3\lfloor l'/2 \rfloor & \text{with configuration} \\ & \text{1, 2, 6, or 7 (see Table 2)} \\ l' \bmod 2 + 5 & \text{if not in a special subframe} \end{cases}$$

$$l' = \begin{cases} 0, 1, 2, 3 & \text{if } n_s \bmod 2 = 0 \text{ and in a} \\ & \text{special subframe with configuration} \\ & \text{1, 2, 6, or 7 (see Table 2)} \\ 0, 1 & \text{if } n_s \bmod 2 = 0 \text{ and not in a} \\ & \text{special subframe with configuration} \\ & \text{1, 2, 6, or 7 (see Table 2)} \\ 2, 3 & \text{if } n_s \bmod 2 = 1 \text{ and not in a} \\ & \text{special subframe with configuration} \\ & \text{1, 2, 6, or 7 (see Table 2)} \end{cases}$$

$$m' = 0, 1, 2$$

where $n_s$ is the slot number within a radio frame and an integer among 0 to 19. The sequence $\bar{w}_p(i)$ for normal CP is given according to the following equation.

TABLE 6

| Antenna port p | $[\bar{w}_p(0)\ \bar{w}_p(1)\ \bar{w}_p(2)\ \bar{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

For antenna port $p \in \{7, 8, \ldots, v+6\}$, the UE-RS sequence $r(m)$ is defined as follows $$r(m) = \frac{1}{\sqrt{2}}(1 - 2 \cdot c(2m)) + j\frac{1}{\sqrt{2}}(1 - 2 \cdot c(2m+1)), \quad \text{[Equation 3]}$$

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

c(i) is a pseudo-random sequence defined by a length-31 Gold sequence. The output sequence c(n) of length $M_{PN}$, where $n=0, 1, \ldots, M_{PN}-1$, is defined by the following equation.

$$c(n)=(x_1(n+N_C)+x_2(n+N_C)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2 \quad \text{[Equation 4]}$$

where $N_C=1600$ and the first m-sequence is initialized with $x_1(0)=1$, $x_1(n)=0$, $n=1,2,\ldots,30$. The initialization of the second m-sequence is denoted by $c_{init}=\sum_{i=0}^{30} x_2(i) \cdot 2^i$ with the value depending on the application of the sequence.

In Equation 3, the pseudo-random sequence generator for generating c(i) is initialized with $c_{init}$ at the start of each subframe according to the following equation.

$$c_{init}=(\lfloor n_s/2 \rfloor+1) \cdot (2n_{ID}^{(nSCID)}+1) \cdot 2^{16}+n_{SCID} \quad \text{[Equation 5]}$$

In Equation 5, the quantities $n^{(i)}_{ID}$, i=0,1, which is corresponding to $n_{ID}^{(nSCID)}$, is given by a physical layer cell identifier $N^{cell}_{ID}$ if no value for $n^{DMRS,i}_{ID}$ is provided by higher layers or if DCI format 1A, 2B or 2C is used for DCI format associated with the PDSCH transmission, and given by $n^{DMRS,i}_{ID}$ otherwise.

In Equation 5, the value of $n_{SCID}$ is zero unless specified otherwise. For a PDSCH transmission on antenna ports 7 or 8, $n_{SCID}$ is given by the DCI format 2B or 2D. DCI format 2B is a DCI format for resource assignment for a PDSCH using a maximum of two antenna ports having UE-RSs. DCI format 2C is a DCI format for resource assignment for a PDSCH using a maximum of 8 antenna ports having UE-RSs.

In case of DCI format 2B, $n_{SCID}$ is indicated by the scrambling entity field according to the following table.

TABLE 7

| Scrambling identity field in DCI format 2B | $n_{SCID}$ |
|---|---|
| 0 | 0 |
| 1 | 1 |

In case of DCI format 2C, $n_{SCID}$ is given by the following table.

TABLE 8

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 3 layers, ports 7-9 |
| 3 | 1 layer, port 8, $n_{SCID} = 1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

Figure 6:
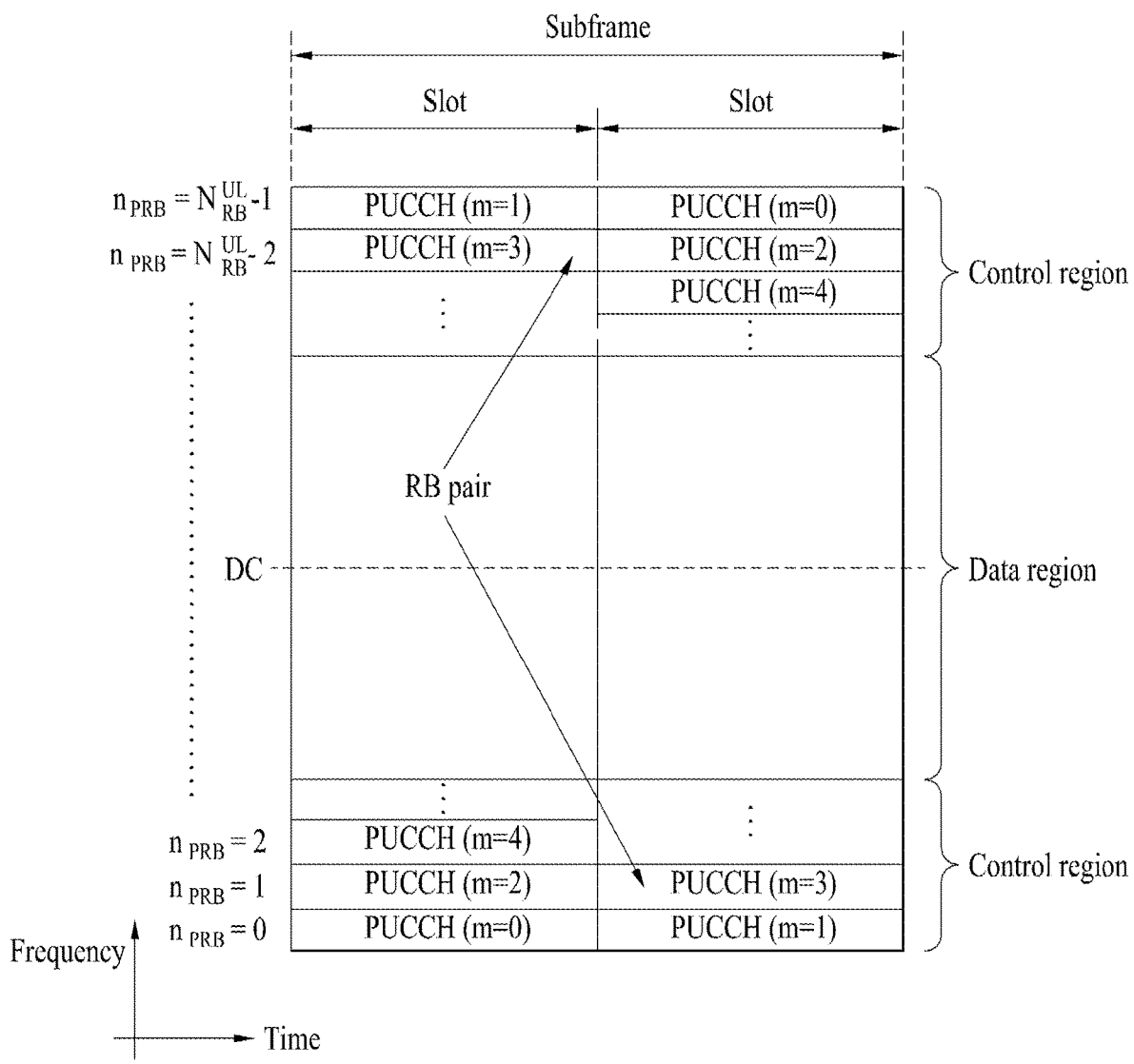
FIG. 6 illustrates the structure of a UL subframe used in a wireless communication system.

FIG. 6 illustrates the structure of a UL subframe used in a wireless communication system.

Referring to FIG. 6, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. CSI may include channel quality information (CQI), a precoding matrix indicator (PMI), a precoding type indicator, and/or a rank indicator (RI). In the CSI, MIMO-related feedback information includes the RI and the PMI. The RI indicates the number of streams or the number of layers that the UE can receive through the same time-frequency resource. The PMI is a value reflecting a space characteristic of a channel, indicating an index of a preferred precoding matrix for DL signal transmission based on a metric such as an SINR. The CQI is a value of channel strength, indicating a received SINR that can be obtained by the UE generally when the eNB uses the PMI.

If a UE uses a single carrier frequency division multiple access (SC-FDMA) scheme in UL transmission, a PUCCH and a PUSCH cannot be simultaneously transmitted on one carrier in a 3GPP LTE release-8 or release-9 system in order to maintain a single carrier property. In a 3GPP LTE release-10 system, support/non-support of simultaneous transmission of the PUCCH and the PUSCH may be indicated by higher layers.

The present invention may be applied to an EPDCCH and a PUSCH, and a PDSCH and/or PUSCH scheduled by the EPDCCH, as well as a PDCCH and a PUCCH, and a PDSCH and/or PUSCH scheduled by the PDCCH.

FIG. 7 illustrates a physical downlink control channel (PDCCH) or an enhanced PDCCH (EPDCCH), and a data channel scheduled by PDCCH/EPDCCH. Particularly, FIG. 7 illustrates the case in which the EPDCCH is configured by spanning the fourth symbol (OFDM symbol #3) to the last symbol of a subframe. The EPDCCH may be configured using consecutive frequency resources or may be configured using discontinuous frequency resources for frequency diversity.

Referring to FIG. 7, PDCCH 1 and PDCCH 2 may schedule PDSCH 1 and PDSCH 2, respectively, and the EPDCCH may schedule another PDSCH. Similarly to the case of a PDCCH, specific resource assignment units may be defined for the EPDCCH and the EPDCCH may be configured by a combination of the defined specific resource assignment units. When the specific resource assignment units are used, there is an advantage of enabling execution of link adaptation because less resource assignment units can be used to configure the EPDCCH in the case of a good channel state and more resource assignment units can be used to configure the EPDCCH in the case of a poor channel state. Hereinafter, in order to distinguish a basic unit of the EPDCCH from a CCE which is a basic unit of the PDCCH, the basic unit of the EPDCCH will be referred to as an enhanced CCE (ECCE). It is assumed hereinafter that, for an aggregation level L of the EPDCCH, the EPDCCH is transmitted on an aggregation of L ECCEs. Namely, like the aggregation level of the PDCCH, the aggregation level of the EPDCCH also refers to the number of ECCEs used for transmission of one DCI. Hereinafter, an aggregation of ECCEs on which the UE is capable of detecting the EPDCCH thereof will be referred to as an EPDCCH search space. DCI carried by the EPDCCH is mapped to a single layer and then precoded.

The ECCEs constituting the EPDCCH may be categorized into a localized ECCE (hereinafter, L-ECCE) and a distributed ECCE (hereinafter, D-ECCE) according to a scheme of mapping the ECCE(s) to RE(s). The L-CCE means that REs constituting an ECCE are extracted from the same PRB pair. If the EPDCCH is configured using L-ECCE(s), beamforming optimized for each UE can be performed. On the other hand, the D-ECCE corresponds to the case in which REs constituting the ECCE are extracted from different PRB pairs. Unlike the L-ECCE, the D-ECCE can acquire frequency diversity in spite of a restriction on beamforming. In localized mapping, a single antenna port $p \in \{107,108,109,110\}$ used for EPDCCH transmission is a function of index(es) of the ECCE for defining the EPDCCH. In distributed mapping, REs in an EREG are associated with one of two antenna ports in an alternating manner.

Unlike the PDCCH transmitted based on the CRS, the EPDCCH is transmitted based on the demodulation RS (hereinafter, DM-RS). Accordingly, the UE decodes/demodulates the PDCCH based on the CRS and decodes/demodulates the EPDCCH based on the DM-RS. The DM-RS associated with EPDCCH is transmitted on the same antenna port $p \in \{107,108,109,110\}$ as the associated EPDCCH physical resource, is present for EPDCCH demodulation only if the EPDCCH transmission is associated with the corresponding antenna port, and is transmitted only on the PRB(s) upon which the corresponding EPDCCH is mapped.

In case of normal CP, for the antenna port $p \in \{107,108,109,110\}$ in a PRB $n_{PRB}$ assigned for EPDCCH transmission, a part of the DM-RS sequence r(m) can be mapped to complex-modulation symbols $a_{k,l}^{(p)}$ in a subframe according to the following equation.

$$a_{k,l}^{(p)} = w_p(l') \cdot r(3 \cdot l' \cdot N_{RB}^{max,DL} + 3 \cdot n_{PRB} + m') \quad \text{[Equation 6]}$$

where $w_p(i)$, l', m' can be given by the following equation.

$$w_p(i) = \begin{cases} \overline{w}_p(i) & (m' + n_{PRB}) \bmod 2 = 0 \\ \overline{w}_p(3-i) & (m' + n_{PRB}) \bmod 2 = 1 \end{cases} \quad \text{[Equation 7]}$$

$$k = 5m' + N_{sc}^{RB} n_{PRB} + k'$$

$$k' = \begin{cases} 1 & p \in \{107, 108\} \\ 0 & p \in \{109, 110\} \end{cases}$$

$$l = \begin{cases} l' \bmod 2 + 2 & \text{if in a special subframe with configuration 3, 4, or 8 (see Table 2)} \\ l' \bmod 2 + 2 + 3\lfloor l'/2 \rfloor & \text{if in a special subframe with configuration 1, 2, 6, or 7 (see Table 2)} \\ l' \bmod 2 + 5 & \text{if not in a special subframe} \end{cases}$$

$$l' = \begin{cases} 0, 1, 2, 3 & \text{if } n_s \text{ mod2} = 0 \text{ and in a} \\ & \text{special subframe with} \\ & \text{configuration 1, 2, 6,} \\ & \text{or 7 (see Table 2)} \\ 0, 1 & \text{if } n_s \text{ mod2} = 0 \text{ and not} \\ & \text{in a special subframe with} \\ & \text{configuration 1, 2, 6,} \\ & \text{or 7 (see Table 2)} \\ 2, 3 & \text{if } n_s \text{ mod2} = 1 \text{ and not} \\ & \text{in a special subframe with} \\ & \text{configuration 1, 2, 6,} \\ & \text{or 7 (see Table 2)} \end{cases}$$

$m' = 0, 1, 2$ where the sequence $\overline{w}_p(i)$ for normal CP is given by the following table.

TABLE 9

| Antenna port p | $[\overline{w}_p(0) \; \overline{w}_p(1) \; \overline{w}_p(2) \; \overline{w}_p(3)]$ |
| --- | --- |
| 107 | [+1 +1 +1 +1] |
| 108 | [+1 −1 +1 −1] |
| 109 | [+1 +1 +1 +1] |
| 110 | [+1 −1 +1 −1] |

For example, in FIG. 7, the REs occupied by the UE-RS(s) of the antenna port 7 or 8 may be occupied by the DM-RS(s) of the antenna port 107 or 108 on the PRB to which the EPDCCH is mapped, and the REs occupied by the UE-RS(s) of antenna port 9 or 10 may be occupied by the DM-RS(s) of the antenna port 109 or 110 on the PRB to which the EPDCCH is mapped. In other words, a certain number of REs are used on each RB pair for transmission of the DM-RS for demodulation of the EPDCCH regardless of the UE or cell if the type of EPDCCH and the number of layers are the same as in the case of the UE-RS for demodulation of the PDSCH. Hereinafter, the PDCCH and the EPDCCH will be simply referred to as PDCCH. Embodiments of the present invention applied to the PDCCH may be similarly applied to the EPDCCH.

For the antenna port $p \in \{7, 8, \ldots, \cup+6\}$, the UE-RS sequence r(m) for the EPDCCH is defined by Equation 3. The pseudo-random sequence c(i) of Equation 3 is defined by Equation 4, and the pseudo-random sequence generator for generating c(i) is initialized as $c_{init}$ at the start of each subframe according to the following equation.

$$c_{init} = (\lfloor n_s/2 \rfloor + 1) \cdot (2n_{ID}^{EPDCCH} + 1) \cdot 2^{16} + n_{SCID}^{EPDCCH} \quad \text{[Equation 8]}$$

The EPDCCH DMRS scrambling sequence initialization parameter $n^{EPDCCH}_{SCID}$ is provided by a higher layer signal.

Figure 8:
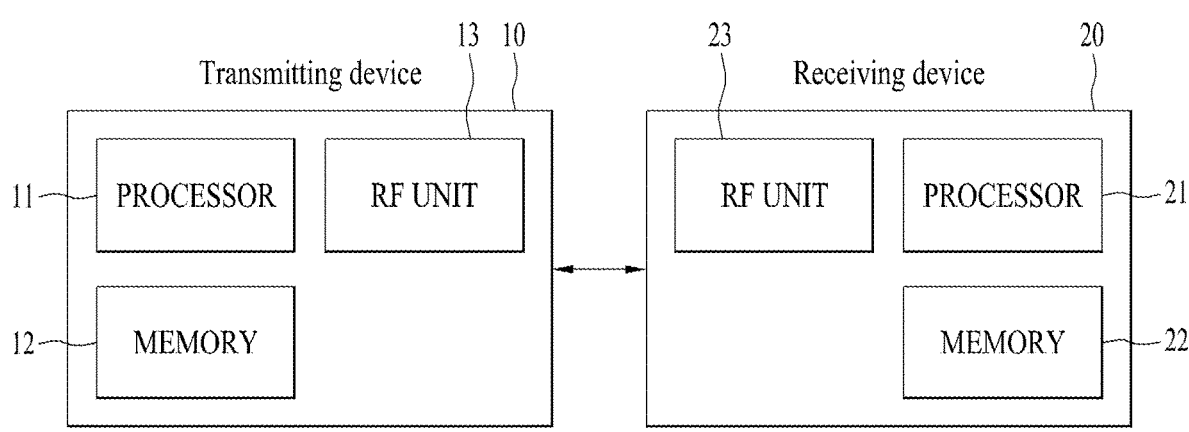
FIG. 8 is a block diagram illustrating elements of a transmitting device 10 and a receiving device 20 for implementing the present invention.

FIG. 8 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into $N_{layer}$ layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

Figure 9:
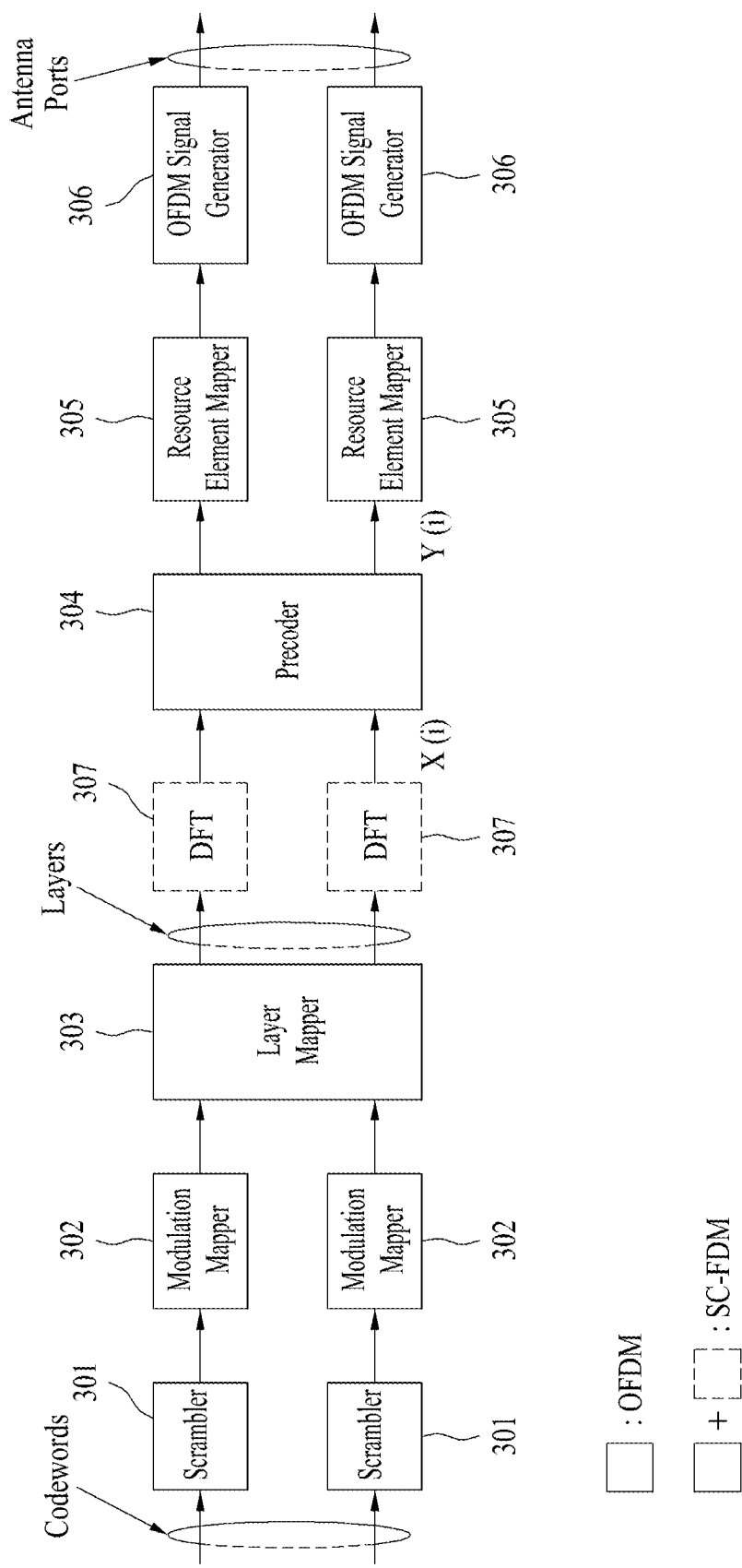
FIG. 9 illustrates an overview of physical channel processing.

FIG. 9 illustrates an overview of physical channel processing. A baseband signal representing a PUSCH or a PDSCH may be defined by a processing procedure of FIG. 9.

Referring to FIG. 9, a transmitting device may include scramblers 301, modulation mappers 302, a layer mapper 303, a precoder 304, RE mappers 305, and OFDM signal generators 306.

The transmitting device 10 may transmit more than one codeword. The scramblers 301 scramble the coded bits of each codeword, for transmission on a physical channel.

The modulation mappers 302 modulate the scrambled bits, thus producing complex-valued modulation symbols. The modulation mappers 302 modulate the scrambled bits to complex-valued modulation symbols representing positions on a signal constellation in a predetermined modulation scheme. The modulation scheme may be, but not limited to, any of m-phase shift keying (m-PSK) and m-quadrature amplitude modulation (m-QAM).

The layer mapper 303 maps the complex-valued modulation symbols to one or several transmission layers.

The precoder 304 may precode the complex-valued modulation symbols on each layer, for transmission through the antenna ports. More specifically, the precoder 304 generates antenna-specific symbols by processing the complex-valued modulation symbols for multiple transmission antennas in a MIMO scheme, and distributes the antenna-specific symbols to the RE mappers 305. That is, the precoder 304 maps the transmission layers to the antenna ports. The precoder 304 may multiply an output x of the layer mapper 303 by an $N_t \times M_t$ precoding matrix W and output the resulting product in the form of an $N_t \times M_F$ matrix z. Here, $N_t$ is corresponding to the number of transmission antennas, and $M_t$ is corresponding the number of layers. Since the precoder 304 is differently configured according to the precoding matrix, if the same precoding matrix is applied to signals, this indicates that the same precoder is applied to signals in the present invention and if different precoding matrices are applied to signals, this indicates that different precoders are applied to signals in the present invention.

The RE mappers 305 map/allocate the complex-valued modulation symbols for the respective antenna ports to REs. The RE mappers 305 may allocate the complex-valued modulation symbols for the respective antenna ports to appropriate subcarriers, and may multiplex them according to UEs.

The OFDM signal generators 306 modulate the complex-valued modulation symbols for the respective antenna ports, that is, the antenna-specific symbols through OFDM or SC-FDM modulation, thereby producing a complex-valued time domain orthogonal frequency division multiplexing (OFDM) or single carrier frequency division multiplexing (SC-FDM) symbol signal. The OFDM signal generators 306 may perform inverse fast Fourier transform (IFFT) on the antenna-specific symbols and insert a cyclic prefix (CP) into the resulting IFFT time domain symbol. Digital-to-analog conversion, frequency upconversion, etc applied to the OFDM symbol and then transmitted through the transmission antennas to a receiving device 20. The OFDM signal generators 306 may include an IFFT module, a CP inserter, a digital-to-analog converter (DAC), a frequency upconverter, etc.

In the meantime, if the UE or eNB applies the SC-FDMA scheme to codeword transmission, the transmitter or processor may include a discrete Fourier transform (DFT) module 307 (or fast Fourier transform (FFT) module). The DFT module 307 performs DFT or FFT (hereinafter referred to as DFT/FFT) on the antenna specific symbol, and outputs the DFT/FFT symbol to the resource element mapper 305.

The receiving device 20 operates in the reverse order to the operation of the transmitting device 10. Specifically, the receiving device may include a signal recoverer for recovering a received signal into a baseband signal, a multiplexer for multiplexing a received and processed signal, and a channel demodulator for demodulating a multiplexed signal stream into a codeword. The signal recoverer, the multiplexer, and the channel demodulator may be comprised of one integrated module or independent modules for performing respective functions. For example, the signal recoverer may include an analog-to-digital converter (ADC) for converting an analog signal into a digital signal, a CP remover for removing a CP from the digital signal, an FFT module for generating a frequency-domain symbol by performing FFT upon the CP-removed signal, and an RE demapper/equalizer for recovering the frequency-domain symbol into an antenna-specific symbol. The multiplexer recovers the antenna-specific symbol into a transmission layer and the channel demodulator recovers the transmission layer into the codeword that the transmitting device desires to transmit.

Meanwhile, upon receiving signals transmitted by an SC-FDMA scheme, the receiving device 20 further includes an inverse discrete Fourier transmission (IFFT) module (or an inverse fast Fourier transform (IFFT) module). The IDFT/IFFT module performs IDFT/IFFT upon the antenna-specific symbols recovered by the RE demapper and transmits the IDFT/IFFT-processed symbol to the multiplexer.

For reference, the processor 11 of the transmitting device 10 may be configured to include the scramblers 301, the modulation mappers 302, the layer mapper 303, the precoder 304, the RE mappers 305, and the OFDM signal generators 306. Likewise, the processor 21 of the receiving device 20 may be configured to include the signal recoverer, the multiplexer, and the channel demodulator.

Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) according to data transmission rate. Since the MTC UE has low mobility, the channel environment thereof remains substantially the same. If an MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, a legacy UE).

When considering the usage of the MTC UE, there is a high probability that the MTC UE requires a signal of wide coverage compared with the legacy UE. Therefore, if the eNB transmits a PDCCH, a PDSCH, etc. to the MTC UE using the same scheme as a scheme of transmitting the PDCCH, the PDSCH, etc. to the legacy UE, the MTC UE has difficulty in receiving the PDCCH, the PDSCH, etc. Therefore, the present invention proposes that the eNB apply a coverage enhancement scheme such as subframe repetition (repetition of a subframe with a signal) or subframe bundling upon transmission of a signal to the MTC UE having a coverage issue so that the MTC UE can effectively receive a signal transmitted by the eNB. For example, the PDCCH and PDSCH may be transmitted to the MTC UE having the coverage issue in a plurality of subframes (e.g. about 100 subframes). In this case, if the PDSCH is transmitted in a subframe in which the PDCCH is transmitted, the UE is problematic in that the PDSCH for all subframes in which the PDCCH is transmitted should be buffered until the UE has successfully received the PDCCH. Further, if the PDCCH is transmitted in each of multiple subframes and the UE has successfully received the PDCCH using the multiple subframes, the UE has a problem with uncertainty about a subframe in which transmission of the PDCCH carrying the same DCI is started. The present invention proposes methods for solving problems which may be generated in the process of transmitting a signal to the MTE UE having the coverage issue. Since embodiments of the present invention described hereinbelow are methods for coverage enhancement, the present invention may be applied not only to the MTC UE but also to other UEs having the coverage issue. Accordingly, the embodiments of the present invention may be applied to a UE operating in a coverage enhancement mode. For convenience of description, a UE configured to implement a coverage enhancement method according to the present invention is referred to as the MTC UE and a UE that is not configured to implement the coverage enhancement method according to the present invention is referred to as the legacy UE.

Hereinafter, a set of subframes in which the receiving device 20 can perform signal transmission used for decoding through combinations of signals will be referred to as a subframe bundle. For example, a set of subframes in which PDCCHs carrying the same DCI can be transmitted may be a subframe bundle for PDCCH transmission. In addition, PDCCHs/PDSCHs/PBCHs/PUCCHs/PUSCHs transmitted in multiple subframes to carry the same data/information/content are respectively referred to as a PDCCH/PDSCH/PBCH/PUCCH/PUSCH bundle. In addition, subframes in which PDCCH/PDSCH/PBCH/PUCCH/PUSCH bundle transmission can be performed are particularly referred to as a PDCCH/PDSCH/PBCH/PUCCH/PUSCH subframe bundle. In a legacy LTE/LTE-A system, physical channels transmitted respectively in consecutive (DL or UL) subframes are individually decoded, rather than being decoded together and restored into one piece of information/data. In contrast, in PDCCH/PDSCH/PBCH/PUCCH/PUSCH bundle transmission according to the present invention, physical channels of multiple subframes in a corresponding bundle carry information/data/content that are identical or can be combined. Accordingly, the UE according to the present invention may decode a physical channel received in one subframe belonging to a subframe bundle or use physical channels received repeatedly in multiple subframes in the subframe bundle for decoding. A maximum number of repetitive transmissions or receptions of a physical channel by the UE may correspond to the size of the subframe bundle.

<A. PDCCH Over Subframes>

Transmission of a PDCCH

Figure 10:
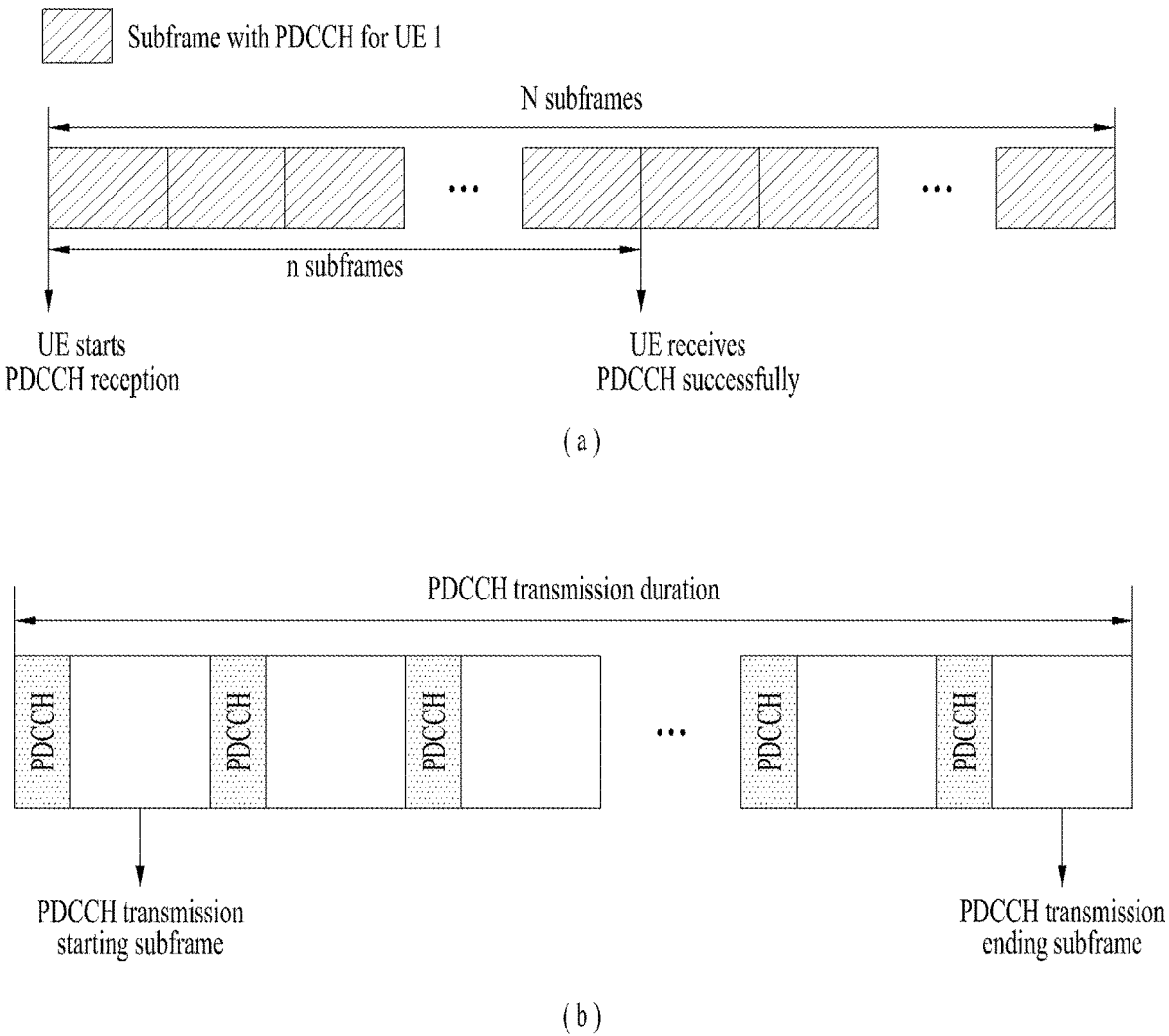
FIG. 10 illustrates a signal transmission/reception method according to embodiment A of the present invention.

FIG. 10 illustrates a signal transmission/reception method according to embodiment A of the present invention.

A PDCCH for an MTC UE may be repeatedly transmitted over numerous subframes for coverage enhancement. The UE may repeatedly receive the PDCCH in a subframe bundle in which multiple subframes are bundled and successfully receive the PDCCH using repeatedly received PDCCH signals in the multiple subframes. For example, as illustrated in FIG. 10(a), the PDCCH may be repeatedly transmitted over a bundle of N subframes. The UE may successfully receive the PDCCH using n ($1 \leq n \leq N$) subframes among the N subframes.

The number, N, of subframes included in a subframe bundle in which the PDCCH is transmitted may always have a cell-specific value. Therefore, both the size of a subframe bundle for PDCCH transmission for cell-specific data transmission such as an SIB etc. or the size of a subframe bundle for PDCCH transmission for UE-specific data transmission may be cell-specific. In this case, the size N of the subframe bundle in which the PDCCH is transmitted may be a predefined fixed value. Alternatively, the size N of the subframe in which the PDCCH is transmitted may be a value configured for the UE through an MIB or an SIB. Such a PDCCH transmission subframe bundle may consist of non-consecutive subframes as well as consecutive subframes.

The size N of the subframe bundle in which the PDCCH is transmitted may be a cell-specific value for PDCCH transmission to transmit cell-specific data such as an SIB or may be a UE-specific value for PDCCH transmission to transmit UE-specific data. The size N of the subframe bundle in which the PDCCH is UE-specifically transmitted may be configured for the UE through a higher layer signal such as an RRC signal. Alternatively, the size N of the subframe bundle may be pre-fixed and pre-stored in the eNB and the UE.

In order for the UE to receive the PDCCH many times through a subframe bundle consisting of multiple subframes, the UE should be aware of a start location of a subframe with the PDCCH. A PDCCH of the legacy LTE/LTE-system may be transmitted in every DL subframe as illustrated in FIG. 4. Accordingly, the PDCCH in the legacy LTE/LTE-A system may be transmitted in an arbitrary DL subframe whenever the eNB requires the PDCCH and the UE attempts to decode the PDCCH in every DL subframe under the assumption that the PDCCH can be received in every DL subframe. In contrast, according to the present invention, transmission of the PDCCH is started only in a prescheduled subframe, not in an arbitrary subframe. Alternatively, such a transmission start subframe location of a PDCCH bundle may be defined as a fixed value. The fixed value may also be transmitted through an MIB. For example, if it is assumed that transmission of the PDCCH bundle is started only in a subframe having an SFN satisfying 'SFN % N=0' (where % denotes a modulo operator), the value N may be transmitted through the MIB. If it is assumed that transmission of the PDCCH bundle is started only in a subframe having an SFN satisfying 'SFN % N=offset', the offset value may be transmitted through the MIB. As an example, if PDCCH transmission for an MTC UE with a coverage issue is started only in subframes (subframe #0, #100, #200, #300, . . . ), the UE may attempt to receive the PDCCH in N subframes starting from a subframe with an SFN corresponding to a multiple of 100. Characteristically, a subframe location at which transmission of a PDCCH bundle may be started may be UE-specific. In this case, information about the subframe location at which transmission of the PDCCH bundle may be started may be pre-configured through a higher layer signal such as an RRC signal. The UE may attempt to receive and/or decode a corresponding PDCCH during N subframes starting from a transmission start subframe of the PDCCH bundle based on the information (e.g. offset and/or N) about the transmission start subframe location of the PDCCH bundle. If the PDCCH carries a DL grant, the UE may attempt to receive and/or decode a PDSCH according to the DL grant in subframe(s) for PDSCH transmission according to the present invention. If the PDCCH carries a UL grant, the UE may attempt to transmit and/or decode a PUSCH according to the UL grant in subframe(s) for PUSCH transmission according to the present invention.

If the PDCCH is transmitted over a bundle of multiple subframes, the PDCCH may be transmitted through all or some subframes during a PDCCH transmission duration as illustrated in FIG. 10(b). In this case, the present invention proposes restricting a UE-specific search space or a transmission resource of the PDCCH transmitted starting from a PDCCH transmission start subframe to a PDCCH transmission end subframe.

A set of PDCCH candidates that the UE is to monitor is defined in the plane of search spaces (SSs) and one SS $S^{(L)}_k$ at an aggregation level $L \in \{1,2,4,8\}$ is defined by the set of PDCCH candidates. For each serving cell on which a PDCCH is monitored, the CCEs corresponding to PDCCH candidate m of the search space $S^{(L)}_k$ are given by the following equation.

$$L\{(Y_k+m')\bmod \lfloor N_{CCE,k}/L \rfloor\}+i \qquad [\text{Equation 9}]$$

where $Y_k$ may be defined by Equation 12, $i=0, \ldots, L-1$. For the common search space, m'=m. For the UE SS, for the serving cell on which the PDCCH is monitored, if a carrier indicator field is configured for a monitoring UE, for example, if the UE is informed that the carrier indicator field is present on the PDCCH by a higher layer, then $m'=m+M^{(L)}n_{CI}$ where $n_{CI}$ is a carrier indicator field value. The carrier indicator field value is the same as a serving cell index (ServCellIndex) of a corresponding serving cell. The serving cell index is a short ID used to identify a serving cell and, for example, any one of integers from 0 to 'maximum number of carrier frequencies which can be configured for the UE at a time minus 1' may be allocated to one serving cell as the serving cell index. That is, the serving cell index may be a logical index used to identify a specific serving cell among cells allocated to the UE rather than a physical index used to identify a specific carrier frequency among all carrier frequencies. In the meantime, if the UE is not configured with carrier indicator field (CIF) then m'=m, where $m'=0, \ldots, M^{(L)}-1$. $M^{(L)}$ is the number of PDCCH candidates to monitor in the given search space. Namely, the UE is configured to confirm $M^{(L)}(\geq L)$ consecutive CCE(s) or CCE(s) deployed by a specific rule in order to determine whether a PDCCH consisting of L CCEs is transmitted thereto. For reference, the CIF is included in DCI and, in carrier aggregation, the CIF is used to indicate for which cell the DCI carries scheduling information. An eNB may inform the UE of whether the DCI received by the UE may include the CIF through a higher layer signal. That is, the UE may be configured with the CIF by a higher layer. Carrier aggregation is described later in more detail.

For the common SSs, $Y_k$ is set to 0 for aggregation levels L=4 and L=8. For the UE-specific SS (UE SS) $S^{(L)}_k$ at aggregation level L, the variable $Y_k$ is defined by the following equation.

$$Y_k=(A \cdot Y_{k-1})\bmod D \qquad [\text{Equation 10}]$$

where $Y_{-1}=n_{RNTI}$, A=39827, D=65537 and $k=\lfloor n_s/2 \rfloor$, $n_s$ is the slot number within a radio frame. SI-RNTI, C-RNTI, P-RNTI, RA-RNTI, etc. may be used as an RNTI for $n_{RNTI}$.

When the PDCCH is transmitted through a bundle of multiple subframes according to the present invention, if the PDCCH can be transmitted through a different PDCCH resource in every subframe, complexity of the UE for receiving the PDCCH is geometrically increased as the number of PDCCH transmission subframes is increased. In other words, if an SS varies according to subframes used for PDCCH bundle transmission, complexity of the UE is increased according to the size of a subframe bundle. Therefore, the present invention proposes that the PDCCH be transmitted according to any one of the following methods when the PDCCH is transmitted through the subframe bundle.

(1) If the eNB transmits the PDCCH through multiple subframes (i.e. in each of the multiple subframes) to the UE during a PDCCH transmission duration, the eNB may transmit the PDCCH through CCE resources using the same value of m (where $m=0, \ldots, M^{(L)}-1$) through either a CSS or a USS during the PDCCH transmission duration. That is, the UE may assume that the PDCCH is transmitted through a USS resource or a CSS resource corresponding to the same value of m during subframes in which the same PDCCH is transmitted.

(2) When the eNB transmits a PDCCH through multiple subframes to the UE during a PDCCH transmission duration, the eNB may transmit the PDCCH using CCE(s) corresponding to m=0 through either the CSS or the USS during the PDCCH transmission duration. That is, the UE may assume that the PDCCH is transmitted through a USS resource or a CSS resource corresponding to m=0 during subframes with the PDCCH carrying the same information/data/content.

(3) If the eNB transmits a UE-specific PDCCH through multiple subframes to the UE during a PDCCH transmission duration, the eNB may transmit the PDCCH through the same CCE (or EREG or RE) resource during the PDCCH transmission duration. If the eNB transmits the UE-specific PDCCH through the same CCE (or EREG or RE) resource during the PDCCH transmission duration, the UE may assume that the CCE (or EREG or RE) resource on which the UE-specific PDCCH is transmitted is the same as a CCE (or EREG or RE) resource transmitted in a PDCCH transmission start subframe.

(3-1) A CCE (or EREG or RE) resource constituting a UE-specific SS, through which the UE-specific PDCCH may be transmitted during the PDCCH transmission duration may be configured identically to a CCE (or EREG or RE) resource applied to the PDCCH transmission start subframe. The CCE (or EREG or RE) resource applied to the PDCCH transmission start subframe may be obtained by Equation 9 in the same manner as a conventional scheme.

(3-2) Alternatively, the CCE (or EREG or RE) resource constituting the UE-specific SS, through which the UE-specific PDCCH may be transmitted during the PDCCH transmission duration may be obtained by Equation 9 and $Y_k$ may be fixedly used as a specific value other than 0.

Transmission of PDSCH/PUSCH

For an MTC UE with a coverage issue, a PDSCH/PUSCH may also be transmitted through a bundle of multiple subframes. As an example, the PDSCH may be transmitted through D subframes and the UE may successfully receive the PDSCH using d ($1 \leq d \leq D$) subframes among the D PDSCH subframes. Alternatively, for example, the UE may transmit the PUSCH in D subframes. The subframe bundle for PDSCH/PUSCH transmission may consist of non-consecutive subframes as well as consecutive subframes.

According to the current LTE standard, the UE may decode a PDCCH and then decode a PDSCH (except for an SPS PDSCH) according to DCI carried by the PDCCH in the same subframe with the PDCCH. For the MTC UE with the coverage issue, since both the PDCCH and the PDSCH can be transmitted over multiple subframes, when the PDSCH should be received after the PDCCH is received may need to be newly defined. Similarly to legacy transmission of the PDCCH and the PDSCH, a PDCCH carrying a DL grant for a PDSCH and the PDSCH may be transmitted to the UE in the same subframe. In this case, since the UE cannot receive a PDSCH associated with the PDCCH until the PDCCH is successfully received, there is a problem in that all PDSCHs received until the UE successively receives the PDCCH should be stored. In the case of the MTC UE, some latency of data transmission is permitted but it is important to reduce manufacturing costs of the MTC UE. The present invention proposes a transmission scheme as illustrated in FIG. 11 in consideration of these characteristics of the MTC UE.

Figure 11:
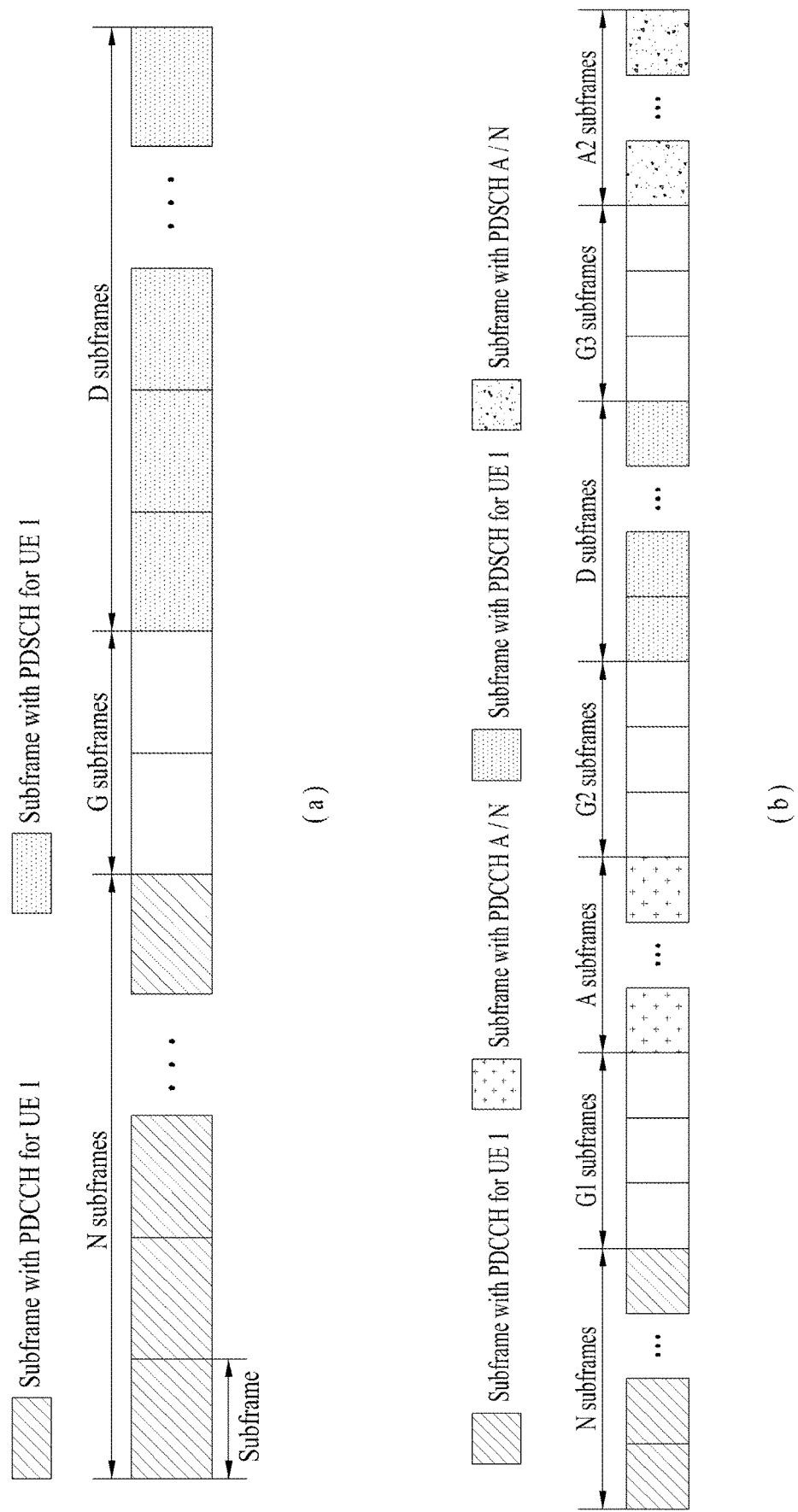
FIG. 11 illustrates another signal transmission/reception method according to embodiment A of the present invention.

FIG. 11 illustrates another signal transmission/reception method according to embodiment A of the present invention.

Referring to FIG. 11(a), the eNB may transmit a PDCCH using a bundle of a total N subframes to the UE. In this case, a PDSCH/PUSCH associated with the PDCCH may be transmitted starting from a subframe which follows G subframes after the entire PDCCH bundle is transmitted. That is, for example, when the last PDCCH is transmitted in subframe N-1, the UE may assume that the PDSCH/PUSCH is transmitted in a bundle of D subframes starting from subframe N+G. Although the values N and D may be set to different values, they may also be set to the same value. If it is defined that N=D is always satisfied, the value D may not be indicated to the UE. The values N and D may be differently or identically set and information about the value D may be included in the PDCCH and then transmitted.

The value G corresponding to a subframe spacing between a PDCCH subframe bundle and a PDSCH/PUSCH subframe bundle may be fixed to an invariant specific value or may be configured for the UE through a higher layer signal such as an MID, an SIB, or a higher layer signal such as an RRC signal. The value G corresponding to the subframe spacing between the PDCCH subframe bundle and the PDSCH subframe bundle may be fixed to 0. That is, transmission of the PDSCH/PUSCH subframe bundle may be immediately performed starting from the next subframe after transmission of the PDCCH subframe bundle is terminated. In addition, the value G corresponding to the subframe spacing between the PDCCH subframe bundle and the PUSCH subframe bundle may be fixed to 4. Alternatively, the value G corresponding to the subframe spacing between the PDCCH subframe bundle and the PUSCH subframe bundle may be fixed to the same value (e.g. $G=k_{PUSCH}$) as a value when the subframe bundle for the PDCCH is not configured. For example, $k_{PUSCH}$ may be 4 for FDD and $k_{PUSCH}$ per TDD DL-UL configuration for TDD may be given as follows.

TABLE 10

| TDD UL-DL configuration | DL subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | 4 | | |
| 3 | 4 | | | | | | | | 4 | 4 |
| 4 | | | 6 | 6 | | | | | 4 | 4 |
| 5 | | | 6 | | | | | | 4 | |
| 6 | 7 | 7 | | | | 7 | 7 | | | |

In Table 10, a number defined for a DL subframe number n per DL-UL configuration may be $k_{PUSCH}$. For example, G3 may be defined depending upon which subframe number corresponds to the last subframe of the PDCCH subframe bundle in one radio frame.

If the location of a subframe at which the PDSCH/PUSCH subframe bundle should be started after the PDCCH subframe bundle is ended is a subframe in which the PDSCH/PUSCH cannot be transmitted, the PDSCH/PUSCH bundle may be started in a subframe which can be used fastest for transmission of the PDSCH/PUSCH among subframes after the subframe in which the PDSCH/PUSCH cannot be transmitted. In other words, if a subframe N+G is not an available subframe for PDSCH/PUSCH transmission, the UE may assume that transmission of the PDSCH/PUSCH bundle is started in a subframe which is available for PDSCH/PUSCH transmission and is nearest the subframe N+G among subframes after the subframe N+G. Even if the start subframe of PDSCH/PUSCH bundle transmission is changed, the size D of the PDSCH/PUSCH bundle may be kept unchanged.

As another method in which the UE can be aware of subframe(s) with a PDSCH/PUSCH indicated by a PDCCH after receiving the PDCCH, the UE may assume that transmission of a PDSCH/PUSCH bundle is started after a predetermined time since transmission of a PDCCH bundle has been started. Assuming that the difference between a subframe location at which transmission of the PDCCH bundle is started and a subframe location at which transmission of the PDSCH/PUSCH bundle is started is K (e.g. K=100, 200, . . . ) subframes, the UE needs to be aware of in which subframe transmission of the PDCCH is started. For example, if it is defined that K='PDSCH/PUSCH start subframe index—PDCCH start subframe index', the UE may be successfully aware of a timing at which the PDSCH/PUSCH is started only when the UE is aware of a timing at which the PDCCH is started. Generally, although the UE will be aware of a transmission start timing of the PDSCH/PUSCH only when the UE is aware of a PDCCH transmission duration N, the above case has an advantage that the UE can be aware of a subframe location at which transmission of the PDSCH is started even if the UE is not accurately aware of the PDCCH transmission duration N. For example, assuming that the eNB transmits the PDCCH a maximum of N times wherein an actual number of transmission times of the PDCCH may differ according to determination of the eNB at a corresponding transmission timing, the UE does not know a transmission end location of the PDCCH but can know a transmission start location of the PDSCH. The value bundling for the PDSCH/PUSCH is not configured. For A/N for the PDSCH, G3 may be 4 for FDD. An A/N signal transmitted in UL subframe n in TDD corresponds to PDCCH(s) and a DL SPS release PDCCH detected by the UE in DL subframe(s) n−k(k∈K) where K is given by a UL-DL configuration. The following table shows K: $\{k_0, k_1, \ldots, k_{M-1}\}$ defined in 3GPP LTE(-A) TDD.

TABLE 11

| DL-UL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | — | 7 | — |

K may be fixed or may be configured for the UE through an MID, an SIG, or a higher layer signal such as an RRC signal. The value K may be configured to always be the same as the number of PDCCH subframe bundles. Namely, the PDSCH/PUSCH subframe bundle may be immediately transmitted starting from the next subframe after transmission of the PDCCH subframe bundle is ended. Alternatively, when the PDCCH bundle consists of N subframes, the difference K between a subframe location at which the PDCCH bundle is started and a subframe location at which the PDSCH/PUSCH bundle is started may be fixed to N−1 wherein transmission of the PDSCH/PUSCH subframe bundle may be started in a subframe in which transmission of the PDCCH subframe bundle is ended.

When a UE-specific PDCCH bundle is received or a PDCCH bundle is received through a USS, if a start subframe of the PDCCH bundle is 0 in FIG. 11(b), information about ACK/NACK for reception of a PDCCH (hereinafter, PDCCH A/N) may be transmitted to the eNB using a UL resource in subframe N+G1 after the next G1 subframes of subframe N−1 in which the PDCCH bundle is ended. Referring to FIG. 11(b), G1 may be 4 and the PDCCH A/N may be transmitted in a bundle of A UL subframes. If PDCCH A/N information indicates ACK, the eNB that has received the PDCCH A/N information from the UE may transmit a PDSCH in a bundle of D subframes starting from subframe N+G1+A+G2 which follows G2 subframes after receiving the PDCCH A/N in a bundle of subframes N+G1 to N+G+A−1 with the PDCCH A/N. After receiving the entire PDSCH bundle, the UE may transmit A/N information for the PDSCH through a bundle of A2 UL subframes starting from subframe N+G1+A+G2+G3 which follows G3 subframes starting from the next subframe of subframe N+G1+A+G2−1 in which the PDSCH bundle is ended. Alternatively, the UE may receive the A/N information for the PUSCH through a bundle of A2 UL subframes starting from subframe N+G1+A+G2+G3 which follows G3 subframes after transmitting the entire PUSCH bundle to the eNB.

The values G1, G2, G3, A, and A2 may be fixed or may be configured for the UE through an MID, an SIG, or a higher layer signal such as an RRC signal. Characteristically, the values N, D, A, and A2 may be identically configured. The value G2 may be 4. The value G3 may be 4 or may be the same value as a value when subframe In Table 11, a number defined for subframe n per DL-UL configuration may be associated with k. For example, G3 may be determined depending upon which subframe number corresponds to the last subframe of the PDSCH subframe bundle. For A/N for the PUSCH, G3 may be 4 in FDD and may be given as $k_{PHICH}$ in TDD. The following table shows $k_{PHICH}$ per TDD DL-UL configuration.

TABLE 12

| TDD UL-DL configuration | UL subframe number n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

In Table 12, a number defined for UL subframe number n per DL-UL configuration may be used as $k_{PHICH}$. For example, G3 may be determined depending upon which subframe number corresponds to the last subframe of the PUSCH subframe bundle in one radio frame.

FIG. 12 illustrates still another signal transmission/reception method according to embodiment A of the present invention.

As another method in which an MTC UE with a coverage issue transmits a PDSCH may be as follows. For the MTC UE with the coverage issue, transmission of a PDCCH performed through a bundle of multiple subframes may be started only at a prescheduled subframe location. In this case, a PDSCH bundle transmitted according to a grant through the PDCCH may be simultaneously started in a subframe in which transmission of the PDCCH is started as illustrated in FIG. 12(a).

A special subframe (e.g. special subframe configuration 0 or 5) in which the PDSCH cannot be transmitted in TDD mode may be included in a subframe duration during which the PDCCH and the PDSCH should be transmitted. In this case, the following method may be used for transmission of the PDCCH and the PDSCH. First, if it is assumed that the PDCCH should be transmitted through a bundle of N subframes and the PDSCH should be transmitted through a bundle of D subframes, the PDCCH may be transmitted in each of N subframes for PDCCH bundle transmission as illustrated in FIG. 12(b). The PDSCH may be transmitted in each of D subframes in which the PDSCH can be transmitted except for a subframe (e.g. special subframe) in which the PDSCH cannot be transmitted. In other words, the number D of subframes for PDSCH bundle transmission may be counted except for the special subframe. Alternatively, the number D of subframes for PDSCH bundle transmission including the special subframe may be counted wherein the UE may decode the PDSCH by combining signals after puncturing a signal of the special subframe, i.e. except for the signal received in the special subframe. This method may be applied not to all special subframes but to special subframes (e.g. corresponding to special subframe configuration 0 or 5).

<B. No PDCCH Transmission>

Figure 13:
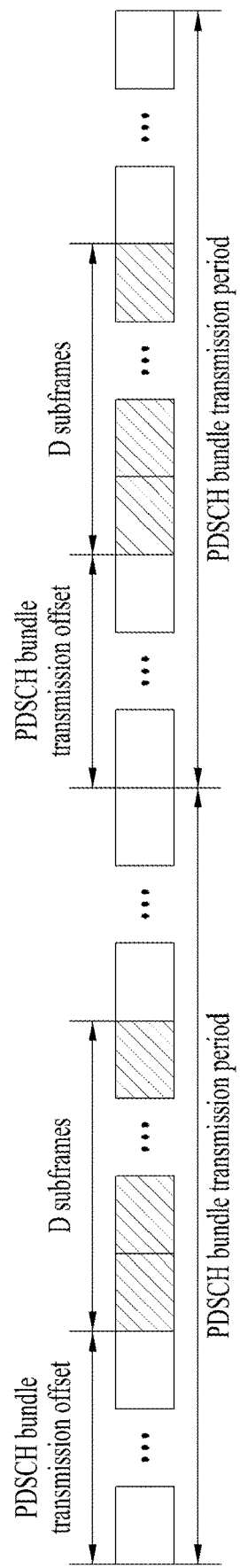
FIG. 13 illustrates a signal transmission/reception method according to embodiment B of the present invention.

FIG. 13 illustrates a signal transmission/reception method according to embodiment B of the present invention.

When repetitive transmission of a PDCCH is performed in order to transmit the PDCCH to an MTC UE with a coverage issue, transmission delay and energy consumption for receiving the PDCCH are remarkably increased. To solve this problem, the present invention proposes that the MTC UE with the coverage issue directly receive a PDSCH without receiving the PDCCH. Alternatively, the present invention proposes that the MTC UE with the coverage issue directly transmit a PUSCH without receiving the PDCCH. To this end, the MTC UE with the coverage issue may receive the PDSCH transmitted thereto or transmit the PUSCH through a determined specific resource region.

Subframes in which the PDSCH is transmitted for the MTC UE with the coverage issue may be reserved by a PDSCH bundle transmission period, a PDSCH bundle transmission offset, and a PDSCH bundle size 'D' as illustrated in FIG. 13. The UE may be additionally aware of an RB resource or region in which the PDSCH is transmitted in a subframe.

Referring to FIG. 13, the PDSCH bundle transmission period may indicate a period during which PDSCH bundle transmission is applied, i.e. a period during which bundled subframes are configured for PDSCH transmission. The bundled subframes refer to a bundle of multiple subframes used for transmission of the same signal/data. The bundled subframes for bundle transmission may be applied only once or may be repeatedly applied every a predetermined number of frames/subframes. Accordingly, subframes may be bundled only once for PDSCH bundle transmission or PDSCH bundle transmission may be performed in subframes for PDSCH bundle transmission at every PDSCH bundle transmission period.

The PDSCH bundle transmission offset may indicate a location at which bundled subframes are started for PDSCH transmission. For example, the PDSCH bundle transmission offset may be information indicating a subframe in which PDSCH bundle transmission is started among subframes in a predetermined number of radio frames or subframes belonging to the PDSCH bundle period. The PDSCH bundle size 'D' may correspond to the number of bundled subframes among subframes belonging to one PDSCH bundle transmission period. If it is assumed that consecutive DL subframes are bundled, subframes for PDSCH bundle transmission may be indicated by the PDSCH bundle transmission offset and the PDSCH bundle size. Instead of the PDSCH bundle transmission offset and PDSCH bundle size, a bitmap consisting of bits corresponding one to one to subframes of a predetermined duration or a PDSCH bundle period may be used to reserve subframes for repetitive PDSCH transmission.

Each element for defining a PDSCH/PUSCH for the MTC UE with the coverage issue may be cell-specific or UE-specific. In the case of a transmission resource of the cell-specific PDSCH/PUSCH, a fixed resource may be predefined as a transmission resource for PDSCH/PUSCH bundle transmission or may be configured for the UE through an MIB, an SIB, or a higher layer signal such as an RRC signal. A transmission resource of the UE-specific PDSCH/PUSCH may be configured for the UE through a higher layer signal such as an RRC signal. Even in the case of the UE-specific PDSCH/PUSCH resource, the same PDSCH/PUSCH resource may be configured for two or more UEs. For example, in order to configure a PDSCH resource region for the MTC UE with the coverage issue, a value of the PDSCH bundle transmission period may be cell-specifically configured and may be configured for the UE through an MIB, an SIB, or a higher layer signal such as an RRC signal. The PDSCH bundle transmission offset, the PDSCH bundle size 'D', and an RB region in which the PDSCH is transmitted in a subframe may be UE-specifically configured and may be configured for the UE through a higher layer signal such as an RRC signal. The bundle transmission offset value may be designated in association with an ID of the UE (e.g. C-RNTI). For example, if the UE is aware of the UE ID thereof (e.g. C-RNTI), the UE may estimate the bundle transmission offset value using the UE ID.

A PDSCH region for cell-specific data transmission, such as an SIB, may be cell-specifically designated. A PDSCH resource region for UE-specific data transmission such as data transmission for a specific UE may be cell-specifically designated or UE-specifically designated. Upon receiving cell-specific data through the cell-specific PDSCH resource region, the UE may use an SI-RNTI for the MTC UE with the coverage issue (hereinafter, MTC-SI-RNTI). The MTC-SI-RNTI may be predefined as a specific value among values which are not used for other RNTIs according to standard technology. Alternatively, the eNB may inform the UE of the MTC-SI-RNTI included in an MIB.

Alternatively, upon receiving the UE-specific data through the cell-specific or UE-specific PDSCH resource region, the UE may use the C-RNTI. For example, the MTC-SI-RNTI or the C-RNTI may be used in the following processes.

1) Scrambling of bits in a transmission block or code block of a corresponding PDSCH 2) Attachment of a CRC to a transmission block or code block of a corresponding PDSCH 3) Scrambling of a pseudo-random sequence for generation of a UE-RS transmitted through the RB region of a corresponding PDSCH Regarding Procedure 1), referring to FIG. 9, bits in each codeword transmitted on a physical channel in one subframe are scrambled prior to modulation 302. The block of bits $b^{(q)}(0), \ldots, b^{(q)}(M_{bit}^{(q)}-1)$ for codeword q can be scrambled, resulting in a block of scrambled bits $\tilde{b}^{(q)}(0), \ldots, \tilde{b}^{(q)}(M_{bit}^{(q)}-1)$, according to the following equation, where $M^{(q)}_{bit}$ is the number of bits in codeword q.

$$\tilde{b}^{(q)}(i)=(b^{(q)}(i)+c^{(q)}(i)) \bmod 2 \qquad \text{[Equation 11]}$$

where the scramble sequence $c^{(q)}(i)$ can be given by Equation 7. The scrambling sequence generator is initialized at the start of each subframe. In case of a transport block for PDSCH, the initialization value $c_{init}$ is given by the following equation.

$$c_{init}=n_{RNTI} \cdot 2^{14}+q \cdot 2^{13}+\lfloor n_s/2 \rfloor \cdot 2^9+N_{ID}^{cell} \quad \text{[Equation 12]}$$

In the present invention, a UE operating in the coverage enforcement mode may apply the MTC-SI-RNTI to $n_{RNTI}$ in Equation 12.

Regarding Procedure 2), a transmission block to be transmitted through the PDSCH is subjected to transmission block processing, transmission block CRC attachment, code block segmentation and code block CRC attachment, channel coding, and rate matching and code block concatenation before mapping to a PDSCH. Error detection is applied to the transmission block or code block through the CRC. The entire transmission block or entire code block is used in calculating CRC parity bits to be attached thereto. In the present invention, the MTC-SI-RNTI or the C-RNTI may be used to calculate CRC parity bits. In addition, the CRC parity bits calculated using the MTC-SI-RNTI or the C-RNTI may be added to a transmission block or a code block corresponding to a higher layer signal according to an embodiment of the present invention. Let's assume that the MTC-SI-RNTI or the C-RNTI is $a_0, a_1, a_2, a_3, \ldots, a_{A-1}$ and the CRC parity bits are $b_0, b_1, b_2, b_3, \ldots, b_{L-1}$ where A is the length of the MTC-SI-RNTI or the C-RNTI and L is the number of parity bits. The CRC parity bits may be generated, for example, by one of the following cyclic generator polynomials.

$$g_{CRC24A}(D)=[D^{24}+D^{23}+D^{18}+D^{17}+D^{14}+D^{11}+D^{10}+D^7+D^6+D^5+D^4+D^3+D+1] \quad \text{[Equation 13]}$$

$$g_{CRC24B}(D)=[D^{24}+D^{23}+D^6+D^5+D+1] \quad \text{[Equation 14]}$$

Herein, $g_{CRC24A}$ represents a cyclic generator polynomial for generating 24 parity bits to be attached to the transmission block as a CRC, and $g_{CRC24B}$ represents a cyclic generator polynomial for generating 24 parity bits to be attached to the code block as a CRC. Encoding is performed in a systematic form, which means that, in Galois Field of 2, GF(2), the polynomial '$a_0 D^{A+23}+a_1 D^{A+22}+\ldots a_{A-1} D^{A+24}+p_0 D^{23}+p_0 D^{22}+\ldots +p_{22} D^1+p_{23}$' yields a remainder equal to 0 when the polynomial is divided by the corresponding length-24 CRC generator polynomial, $g_{CRC24A}$ or $g_{CRC24B}$.

Alternatively, the CRC may be calculated using Equation 13 and Equation 14 with respect to all transmission blocks or all code blocks to which the CRC will be added and the calculated CRC may be scrambled with the MTC-SI-RNTI or the C-RNTI and then added to a corresponding transmission block or code block. For example, CRC parity bits $b_0, b_1, b_2, b_3, \ldots, b_{L-1}$ may be scrambled with $x_{rnti,0}, x_{rnti,1}, x_{rnti,2}, \ldots, x_{rnti,C-1}$ which is the MTC-SI-RNTI or the C-RNTI according to the following equation.

$$c_k=(b_k+x_{rnti,k}) \bmod 2 \text{ for } k=0,1,2,\ldots,C-1 \quad \text{[Equation 15]}$$

where $x_{rnti,0}$ is the most significant bit of the MTC-SI-RNTI or the C-RNTI and C denotes the length of the MTC-SI-RNTI or the C-RNTI.

In relation to process 3), the MTC-SI-RNTI or the C-RNTI may be applied to a scrambling ID $n_{SCID}$ of Equation 12. Since the UE is aware of the MTC-SI-RNTI or the C-RNTI used as the scrambling ID used to generate a UE-RS, the UE may be aware of a UE-RS sequence transmitted together with a PDSCH and may decode the PDSCH using the UE-RS sequence, thereby acquiring a higher layer signal carried by the PDSCH.

Upon receipt of a UE-specific PDSCH bundle, the UE may transmit A/N information for PDSCH reception using a UL resource to the eNB after G3 subframes. In this case, G3 may be 4 or may be the same value as a value when subframe bundling for a PDSCH/PUSCH is not configured and the A/N information may be transmitted through a bundle of A1 UL subframes. Alternatively, the UE may receive A/N information for a PUSCH through a bundle of A2 UL subframes starting from a subframe after G3 subframes since the entire PUSCH bundle has been transmitted to the eNB. The value G3 and A1 may be fixed or may be configured for the UE through an MID, an SIB, or a higher layer such as an RRC signal.

The PDSCH bundle transmission period, PDSCH bundle transmission offset, and/or PDSCH bundle size described in embodiment B of the present invention may be used not only for reservation/configuration of subframes for PDSCH transmission but also for reservation/configuration of subframes for bundle transmission of other physical channels. For example, the bundle transmission period, the bundle transmission offset, and/or the subframe bundle size may be used for reservation of subframes for repetitive transmission, i.e. for configuration of a subframe bundle, of physical channels (e.g. a PDCCH, a PBCH, a PUCCH, a PUSCH, a PHICH, etc.) in embodiment A and embodiments C to G of the present invention.

<C. Shortened PDCCH>

FIG. 14 illustrates a signal transmission/reception method according to embodiment C of the present invention.

When repetitive transmission of a PDCCH is performed in order to successfully transmit the PDCCH to an MTC UE with a coverage issue, there is a problem of remarkably increasing transmission delay and energy consumption for repetitive transmission. To solve this, the present invention proposes transmitting, to the MTC UE with the coverage issue, a shortened PDCCH containing only information indicating whether a PDSCH is transmitted or a shortened PDCCH information indicating whether a PDSCH is transmitted. The UE may receive less information only indicating whether the PDSCH is transmitted thereto through the shortened PDCCH and, if the PDSCH is transmitted thereto, the UE may receive data through a determined PDSCH resource or region (hereinafter, resource/region). For example, the shortened PDCCH may include only information about an ID of the UE (e.g. C-RNTI) at which the PDCCH is targeted. Upon receiving or detecting the PDCCH including the information about the UE ID of the UE (e.g. C-RNTI), the UE may assume that the PDSCH is transmitted thereto.

When the shortened PDCCH is used for data transmission to the MTC UE with the coverage issue, if a shortened PDCCH for a specific UE (e.g. UE1) is transmitted through a specific subframe as illustrated in FIG. 14(a), a PDSCH may be transmitted through a bundle of D subframes starting from a subframe with the shortened PDCCH. In UL, if a shortened PDCCH for a specific UE is transmitted through a specific subframe, the UE that has received the shortened PDCCH may transmit a PUSCH through the bundle of D subframes starting from the fourth subframe after the specific subframe. The shortened PDCCH may include information about the number of subframes in which the PDSCH is transmitted, i.e. about the size D of a PDSCH bundle.

The UE that has received the shortened PDCCH may receive data transmitted thereto through a determined PDSCH resource/region. In order to designate the PDSCH resource/region and transmit data through the PDSCH resource/region, the schemes mentioned in embodiment B of the present invention as described above may be applied. The PDSCH resource/region may be cell-specific or UE-specific. In addition, the PDSCH resource/region for transmitting cell-specific data, such as an SIB, may be cell-specifically designated. The PDSCH resource/region for transmission of UE-specific data such as transmission of data for a specific UE may be cell-specifically designated or UE-specifically designated.

Alternatively, the PDSCH resource/region for the MTC UE with the coverage issue may be determined according to a PDCCH resource/region in which the shortened PDCCH is transmitted. For example, the PDSCH resource/region determined according to the PDCCH resource/region may be present as illustrated in FIG. 14(b). For example, the PDSCH resource may be determined according to a PDCCH candidate index or a CCE index of a PDCCH (e.g. an index of the first CCE among CCEs included in the PDCCH). Referring to FIG. 14(b), when the UE receives the shortened PDCCH transmitted thereto through a PDCCH 1 resource/region, the UE may receive data through a PDSCH resource/region associated with PDCCH 1 and, when the UE receives the shortened PDCCH transmitted to the UE through a PDCCH 2 resource/region, the UE may receive data through a PDSCH resource/region associated with the PDCCH 2 resource/region. For example, the UE may be aware of a PDSCH resource linked to a PDCCH based on a resource index of the PDCCH.

Upon receiving a UE-specific PDSCH bundle, the UE may transmit A/N information for PDSCH reception to the eNB using a UL resource after G3 subframes. In other words, the UE may transmit the A/N information to the eNB using a resource for A/N transmission in the G3-th subframe after receiving the UE-specific PDSCH bundle. The value G3 may be 4 or may be the same value as a value in the case in which subframe bundling for the PDSCH/PUSCH is not configured. The A/N information may be transmitted through a bundle of A1 UL subframes. Alternatively, the UE may receive the A/N information for the PUSCH through a bundle of A2 UL subframes starting from a subframe which follows G3 subframes after transmitting the entire PUSCH bundle to the eNB (i.e. from the G3-th subframe after transmitting the entire PUSCH bundle). The values G3 and A1 may be fixed values or may be configured for the UE through an MID, an SIB, or a higher layer signal such as an RRC signal.

<D. Conflict issue between PDCCH and PDSCH>

Figure 15:
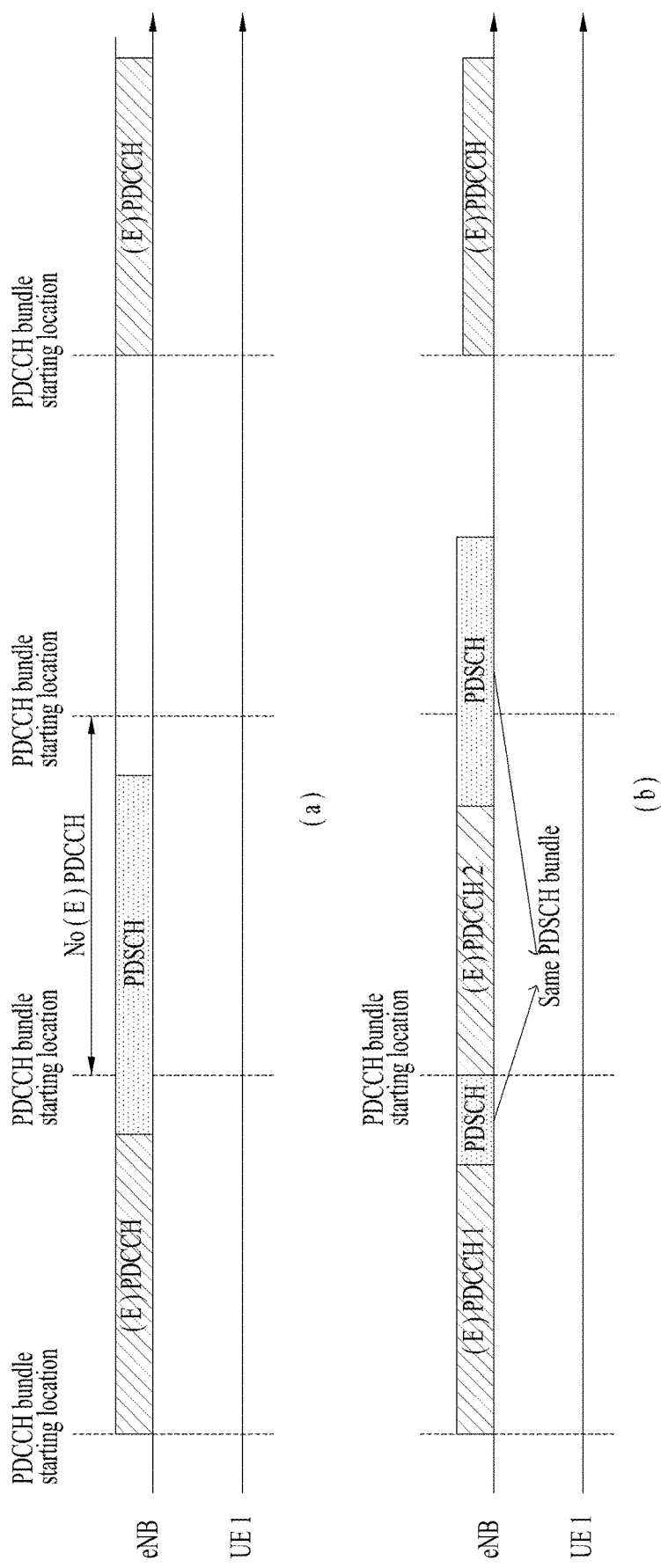
FIGS. 15, 16, and 17 illustrate signal transmission/reception methods according to embodiment D of the present invention.
Figure 16:
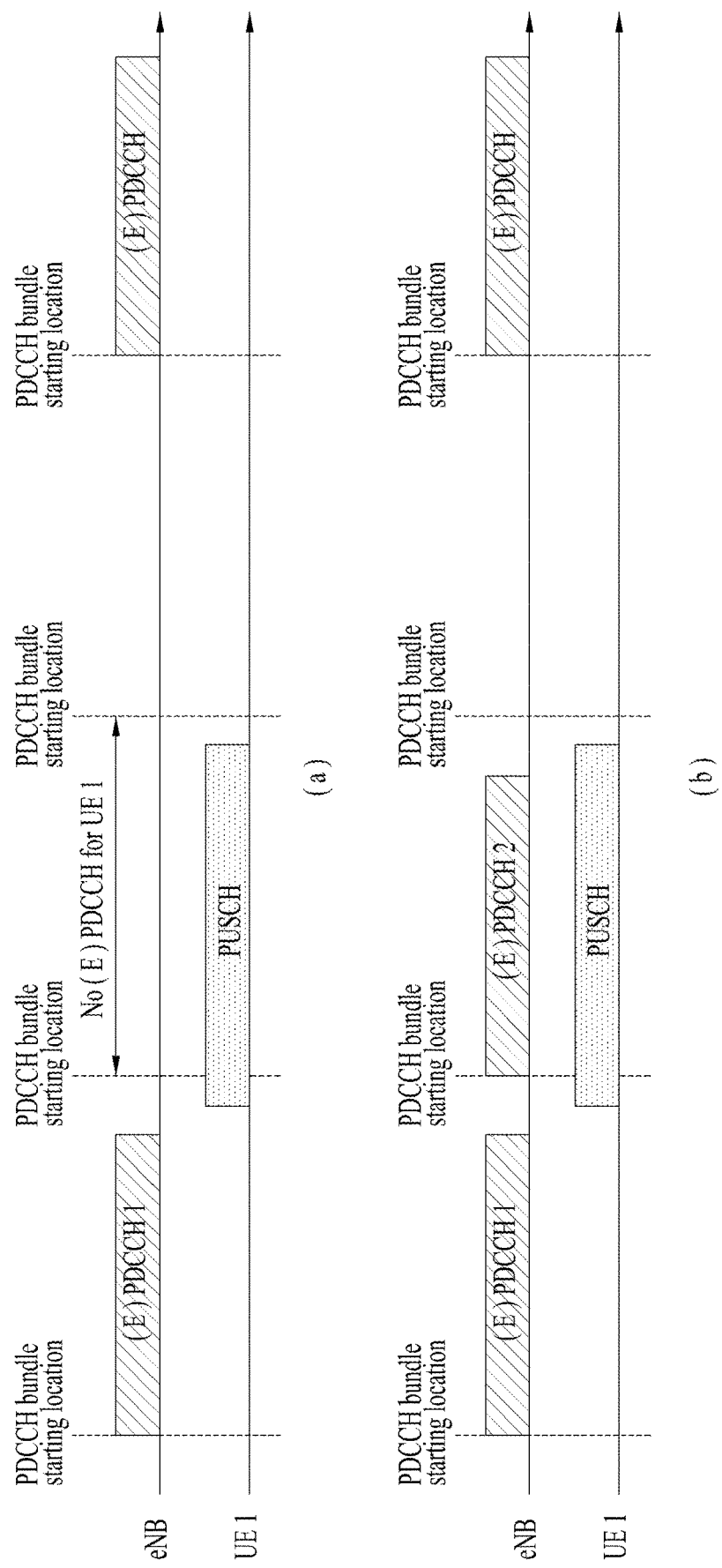
Figure 17:
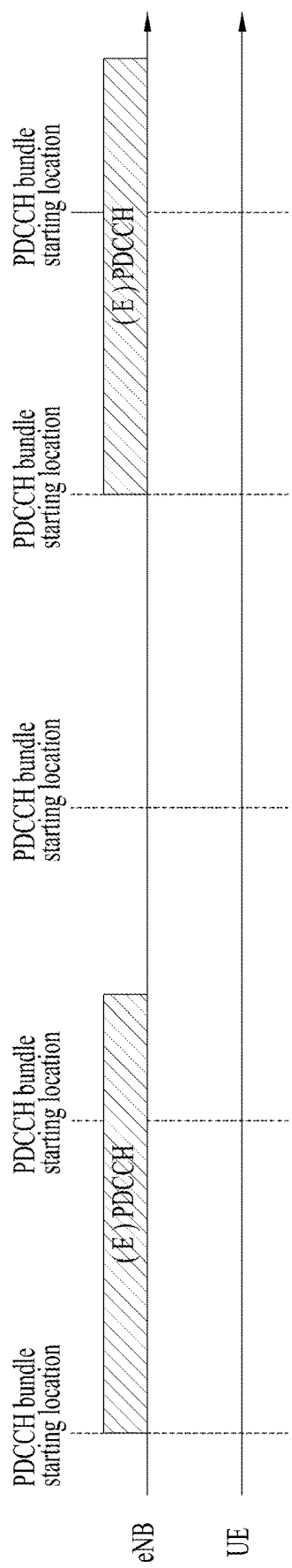

FIGS. 15, 16, and 17 illustrate signal transmission/reception methods according to embodiment D of the present invention. Embodiment D of the present invention may be applied together with at least one of embodiment A and embodiments C to G of the present invention.

As mentioned above, for the MTC UE, a PDCCH may be transmitted in the form of a PDCCH bundle through a plurality of consecutive or non-consecutive subframes and transmission of such a PDCCH bundle may be started at a predetermined or preconfigured subframe location. In this case, a subframe in which the UE should receive a PDSCH bundle may overlap with a subframe in which transmission of a new PDCCH bundle can be started. Then, the UE may assume that a new PDCCH (that the UE should receive) is not transmitted while the UE receives one PDSCH bundle as illustrated in FIG. 15(a).

Alternatively, when a subframe in which the PDSCH bundle should be received overlaps with a subframe in which transmission of the new PDCCH bundle can be started, the UE may stop receiving the PDSCH bundle that the UE receives and attempt to receive the new PDCCH bundle, as illustrated in FIG. 15(b). Alternatively, the UE may stop receiving the PDSCH bundle that the UE receives and may not attempt to receive a PDCCH bundle under the assumption that a PDCCH bundle for another UE can be transmitted in a duration during which a PDCCH bundle can be transmitted. After receiving a PDCCH bundle or after a subframe in which a PDCCH bundle is transmitted, the UE may continue to receive the PDSCH bundle that the UE has temporarily stopped receiving. When the UE stops receiving the PDSCH bundle and attempts to receive the new PDCCH bundle due to overlap between a subframe in which the UE should receive the PDSCH bundle and a subframe in which transmission of the new PDCCH bundle can be started, the eNB may not transmit a DL grant to the UE in the corresponding PDCCH bundle and may transmit only a UL grant. The UE may assume that the DL grant is not transmitted in the corresponding PDCCH bundle.

When a PDCCH is transmitted in the form of a PDCCH bundle for the MTC UE and transmission of the PDCCH bundle is started at a predetermined subframe location, a subframe for transmission of a PUSCH bundle may overlap with a subframe in which transmission of a new PDCCH bundle is started. In this case, the UE may assume that the PDCCH that the UE should receive is not transmitted in a duration during which the PUSCH bundle is transmitted as illustrated in FIG. 16(a). Alternatively, if timings of a subframe for transmission of the PDSCH bundle and a subframe for transmission of the new PDCCH bundle overlap, i.e. if PUSCH bundle transmission and new PDCCH bundle transmission collide, the UE may transmit the PUSCH bundle and simultaneously attempt to receive the new PDCCH bundle as illustrated in FIG. 16(b). In this case, the UE may assume that a UL grant is not transmitted thereto through a PDCCH bundle colliding with a PUSCH bundle transmission timing. Alternatively, the UE may transmit the PUSCH bundle and simultaneously attempt to receive the new PDCCH bundle. The UE may assume that the UL grant is not transmitted thereto if transmission of the PDCCH bundle is ended before transmission of the PUSCH bundle is ended. Alternatively, the UE may assume that the UL grant is not transmitted thereto if transmission of the PDCCH bundle is ended prior to X (e.g. X=4) subframes starting from a subframe in which transmission of the PUSCH bundle is ended.

Meanwhile, as illustrated in FIG. 17, the length of the PDCCH bundle may be greater than a spacing between subframe locations at which transmission of the PDCCH bundle can be started. In this case, if the UE does not simultaneously receive different PDCCH bundles, the UE may assume that only one PDCCH is transmitted thereto at a time.

<E. Conflict issue between PBCH and PDSCH>

Figure 18:
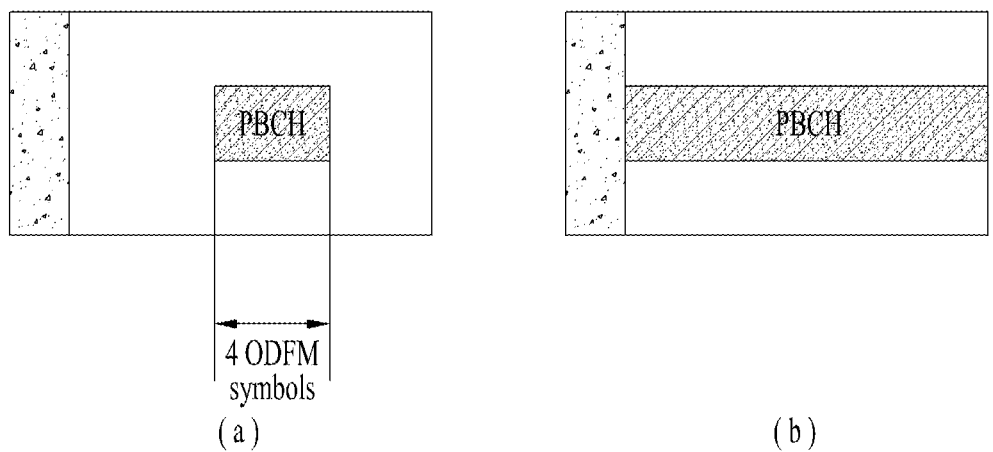
FIG. 18 illustrates a signal transmission/reception method according to embodiment E of the present invention.

FIG. 18 illustrates a signal transmission/reception method according to embodiment E of the present invention.

As described above, for an MTC UE requiring coverage enhancement, a PDSCH may be transmitted through a plurality of consecutive or non-consecutive subframes. Similarly, a PBCH may be transmitted through multiple subframes for coverage enhancement of the MTC UE. In the first subframe #0 of each 10 ms radio frame, as illustrated in FIG. 18(a), in addition to an existing PBCH transmitted in 6 center RBs of 4 OFDM symbols (OFDM symbols #7 to #10), an additional PBCH may be transmitted in a subframe in which the existing PBCH is not transmitted (e.g. subframes #1 to #9 of each 10 ms radio frame). In this case, a PBCH in an additional subframe may be transmitted through an RE resource on which the existing PBCH is transmitted as illustrated in FIG. 18(a) or may be transmitted through all OFDM symbol resources/regions except for a PDCCH resource/region in the corresponding subframe as illustrated in FIG. 18(b). Hereinafter, in the present invention, a PBCH for the MTC UE performing coverage enhancement transmitted in an additional subframe other than a conventionally transmitted PBCH will be referred to as an additional PBCH.

When a PBCH is transmitted through multiple subframes for the MTC UE requiring coverage enhancement, a legacy UE does not know presence of an additional PBCH transmitted through subframes in which an existing PBCH has not been transmitted. Accordingly, when the eNB transmits a PDSCH (or EPDCCH) to the legacy UE in a subframe in which the additional PBCH for the MTC UE performing coverage enhancement is transmitted, the eNB performs scheduling of the PDSCH (or EPDCCH) avoiding a PRB resource/region (e.g. 6 center PRBs) in which the additional PBCH is transmitted.

If the eNB transmits the PDSCH (or EPDCCH) to the MTC UE in a subframe in which the addition PBCH is transmitted when the PBCH is transmitted through a plurality of subframes for the MTC UE requiring coverage enhancement, the eNB may perform scheduling of the PDSCH (or EPDCCH) avoiding the PRB resource/region (e.g. 6 center PRBs) in which the additional PBCH is transmitted.

When the PBCH is transmitted through multiple subframes for the MTC UE requiring coverage enhancement, the MTC UE may be aware of the fact that the additional PBCH is transmitted and of a transmission resource on which the additional PBCH is transmitted. If PRB resources/regions in which the additional PBCH and the PDSCH are transmitted overlap when the PDSCH is transmitted to the MTC UE, the eNB may not transmit the PDSCH to the MTC UE in a corresponding subframe. For example, the UE may assume that, if the PRB resources/regions of the additional PBCH and the PDSCH overlap, the PDSCH is not transmitted in a corresponding subframe. That is, the UE may not expect that the PDSCH will be transmitted in a subframe in which transmission of the additional PBCH and transmission of the PDSCH collide. Alternatively, if the PRB resources/regions of the additional PBCH and the PDSCH overlap when the PDSCH is transmitted to the MTC UE, the eNB may rate-match the PDSCH with respect to an RE resource/region in which the additional PBCH is transmitted in a corresponding subframe and transmit the rate-matched PDSCH to the MTC UE. Namely, if the PRB resources/regions of the additional PBCH and the PDSCH overlap, the UE may assume that the PDSCH is rate-matched with respect to the additional PBCH resource/region in a corresponding subframe and then transmitted.

<F. Number of repetitions of PDCCH and PDSCH>

Figure 19:
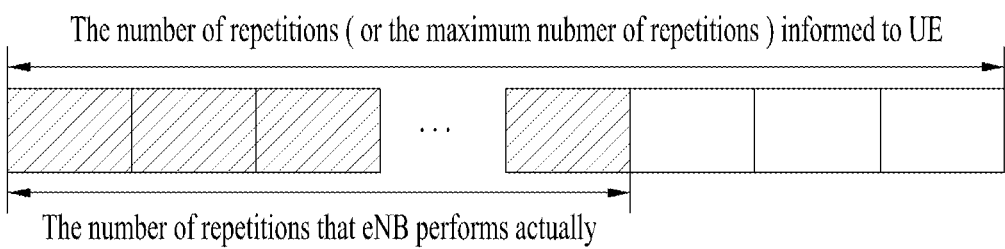
FIG. 19 illustrates a signal transmission/reception method according to embodiment F of the present invention.

FIG. 19 illustrates a signal transmission/reception method according to embodiment F of the present invention.

The number of repetitions of a PDCCH transmitted by the eNB to the MTC UE may be differently configured per UE or may be cell-specifically configured, at an access initial step. Alternatively, the number of repetitions of the PDCCH may be semi-statically changed through RRC configuration. Then, the UE may perform decoding under the expectation that a repeatedly transmitted PDCCH will be transmitted a specific number of times. However, in order to reduce scheduling flexibility and signaling overhead of the eNB, the eNB may transmit the PDCCH through fewer repetitions than the number of repetitions of the PDCCH (or a maximum number of repetitions of the PDCCH) which is indicated to the UE or determined according to a value necessary for coverage enhancement of the UE, as illustrated in FIG. 19. In this case, the UE may assume that a PDCCH bundle can be transmitted through fewer repetitions than the number of repetitions of the PDCCH (or a maximum number of repetitions of the PDCCH) which is configured by the eNB for the UE or determined according to the value necessary for coverage enhancement of the UE. For example, the eNB may flexibly transmit the PDCCH through repetitions equal to or less than the number of repetitions of the PDCCH expected by the UE according to a channel environment of the UE or scheduling restrictions. In this case, since the UE does not know a bundle size of an actually transmitted PDCCH, the UE may attempt to decode the PDCCH in every subframe.

Meanwhile, the number of repetitions of a PDSCH may be differently configured per UE or may be cell-specifically configured, at an access initial step. Alternatively, the number of repetitions of the PDSCH may be semi-statically changed through RRC configuration. Alternatively, the number of repetitions of the PDSCH may be configured through a PDCCH whenever the PDSCH is transmitted. However, in order to reduce scheduling flexibility and signaling overhead of the eNB, the eNB may transmit the PDSCH through fewer repetitions than the number of repetitions of the PDSCH (or a maximum number of repetitions of the PDSCH) which is indicated to the UE or determined according to the value necessary for coverage enhancement of the UE. In this case, the UE may assume that a PDSCH bundle can be transmitted through fewer repetitions than the number of repetitions of the PDSCH (or a maximum number of repetitions of the PDSCH) which is configured by the eNB for the UE or determined according to the value necessary for coverage enhancement of the UE. For example, the eNB may flexibly transmit the PDSCH through repetitions equal to or less than the number of repetitions of the PDSCH expected by the UE according to a channel environment of the UE or scheduling restrictions. In this case, since the UE does not know a bundle size of an actually transmitted PDSCH, the UE may attempt to decode the PDSCH in every subframe.

In addition, the eNB may inform the UE of a minimum number of repetitions of the PDCCH/PDSCH. Alternatively, the minimum number of repetitions of the PDCCH/PDSCH may be a fixed value or a predefined value.

When it is difficult for the UE to successfully receive data over one PDCCH/PDSCH, if the UE is not aware of an accurate number of repetitions of the PDCCH/PDSCH transmitted by the eNB, the UE attempts to receive the PDCCH/PDSCH using PDCCH/PDSCH subframes up to a maximum number of repetitions. However, if the UE attempts to receive the PDCCH/PDSCH in the PDCCH/PDSCH subframes up to the maximum number of repetitions, since signals of more subframes than a number of repetitions of the PDCCH/PDSCH actually transmitted by the eNB, values that hinder decoding (e.g. data for other UEs or undesired signals) may be frequently used for decoding.

However, when the UE is aware of a minimum number of repetitions of the PDCCH/PDSCH according to the present invention, if HARQ is applied to DL data, the UE may use only the PDCCH/PDSCH corresponding to a minimum number of times for decoding although the UE does not know an accurate number of repetitions of the PDCCH/PDSCH transmitted by the eNB. In this case, values that hinder decoding (e.g. data for other UEs or undesired signals) are not frequently used. If the UE fails to perform decoding although the UE has attempted to decode data using the PDCCH/PDSCH subframes up to the maximum number of repetitions (e.g. when a decoding result is determined to be NACK), the UE may (combine and) store only data transmitted in the PDCCH/PDSCH subframes corresponding to the minimum number of repetitions in a reception HARQ buffer.

The eNB may 1) inform the UE of both maximum and minimum numbers of repetitions and configure the UE to enable a HARQ combining operation (described above) or 2) configure the UE to disable the HARQ combining operation instead of informing the UE of the maximum number of repetitions. Alternatively, similarly, the UE may be configured (by the eNB) to 1) automatically enable the HARQ combining operation (described above) when both the maximum and minimum numbers of repetitions are given or 2) automatically disable the HARQ combining operation if only the maximum number of repetitions is given.

<G. Independent Transmission Timing of PDCCH, PDSCH/PUSCH, and ACK/NACK>

FIG. 20 illustrates a signal transmission/reception method according to embodiment G of the present invention.

As in the case in which the location and period of a subframe in which transmission of a PDCCH bundle for the MTC UE can be started can be determined, the start locations and periods of a subframe bundle for PDSCH/PUSCH transmission and a subframe bundle for ACK/NACK (e.g. PUCCH or PHICH) transmission for data may be determined. Characteristically, information about subframe locations and subframe durations in which transmission of PDCCH, PDSCH/PUSCH, PHICH, and PUCCH bundles is started may be independently configured. For example, when a subframe in which transmission of the PDCCH bundle can be started is subframe n, n may be a value satisfying (n mod D1)=G1 where D1 denotes a period of a subframe in which PDCCH transmission can be started and G1 denotes an offset of a subframe location at which PDCCH transmission can be started. For example, G1 denotes the location of a PDCCH transmission start subframe in a duration of D1. Similarly, if a transmission start subframe of the PDSCH bundle is subframe k and a transmission start subframe of the PUCCH bundle is subframe m, then k and m may be values satisfying (k mod D2)=G2 and (m mod D3)=G3, respectively. In this case, D2 denotes a period of a subframe in which PDSCH transmission can be started, G2 denotes an offset of a subframe location at which PDSCH transmission can be started, D3 denotes a period of a subframe in which PUSCH transmission can be started, and G3 denotes an offset of a subframe location at which PUSCH transmission can be started. The values D1, G1, D2, G2, D3, and G3 may be independently determined.

In this case, as illustrated in FIG. 20, upon receiving the PDCCH bundle for scheduling a PDSCH from the eNB, the UE may receive the PDSCH bundle starting from the nearest subframe among subframes in which transmission of the PDSCH bundle can be started, which are located after X1 subframes starting from a subframe in which transmission of the PDCCH bundle is started. Similarly, in order for the UE that has received the PDSCH bundle to transmit ACK/NACK information for the corresponding PDSCH through a PUCCH, the UE may transmit the PUCCH bundle starting from the nearest subframe among subframes in which transmission of the PUCCH bundle can be started, which are located after X2 subframes starting from a subframe in which transmission of the PDCCH bundle is started. In this case, X1 and/or X2 may be pre-defined values or may be values configured by the eNB.

In the above-described embodiments of the present invention, in order to transmit data and signals suitable for a channel situation to the MTC UE, the eNB needs to distinguish an MTC UE with a coverage issue from an MTC UE without a coverage issue. However, the eNB does not know presence of the UE until the UE transmits a PRACH. Accordingly, since the eNB does not know presence of the UE until the UE receives an SIB for the first time, the UE according to the present invention may determine whether the UE has a coverage issue. For example, the UE may determine whether the UE has a coverage issue using at least one of ①time, the number of subframes, and/or the number of PSSs/SSSs needed to successfully receive a PSS/SSS, ② time, the number of subframes, and/or the number of PBCHs needed to successfully receive a PBCH, ③ a result obtained by performing a radio resource management (RRM) (e.g. a reference signal received power (RSRP)), and ④ time and/or the number of subframes needed to successfully receive an SIB, and/or success/failure of reception of the SIB attempted during a specific time duration. If it is determined that the MTC UE has a coverage issue, the MTC UE may inform the eNB that the MTC UE has a coverage issue by applying a coverage enhancement scheme according to the embodiment(s) of the present invention or transmitting a PRACH defined to indicate the coverage enhancement scheme. Meanwhile, the eNB does not know presence or absence of the UE with a coverage issue before the UE with a coverage issue informs the eNB that the UE has a coverage issue through PRACH transmission (explicitly or implicitly) indicating the coverage issue or before the UE with a coverage issue completes initial access to the eNB. Therefore, the eNB according to the present invention (even if the eNB cannot recognize the MTC UE with a coverage issue) may perform subframe bundle transmission according to the present invention for the MTC UE requiring coverage enhancement. If the UE transmits the PRACH and completes initial access to the eNB, the eNB may determine presence/absence of the UE with a coverage issue, a coverage enhancement level, etc. (through RRM information, etc.) and inform the UE of a determined result.

Embodiments A to G of the present invention may be separately applied or two or more thereof may be applied together.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

For example, the eNB processor may control the eNB RF unit so that a PDCCH, a PDSCH, a PHICH, and/or a PBCH may be (repeatedly) transmitted according to any one of embodiments A to G of the present invention. The eNB processor may control the eNB RF unit so that a PUCCH and/or a PUSCH transmitted by the UE may be (repeatedly) received according to any one of embodiments A to G of the present invention. The eNB processor may (combine and) decode the repeatedly received PUCCH and/or PUSCH. The eNB processor may generate ACK/NACK information according to whether decoding has successfully been performed and control the eNB RF unit so that the ACK/NACK information may be transmitted through the PHICH. The eNB processor may control the eNB RF unit so as to perform repetitive transmission of the PHICH. The eNB processor may control the eNB RF unit so that configuration information of a subframe bundle (e.g. a transmission period, a transmission offset, a start frame, a bundle size, and/or a number of repetitions) may be transmitted for repetitive transmission of the PDCCH, PDSCH, PUCCH, PUSCH, PHICH and/or PBCH. The eNB processor may control the eNB RF unit so that (repetitive) transmission/reception of a corresponding physical channel may be performed in a corresponding bundle based on the configuration information.

The UE processor may control the UE RF unit so that a PDCCH, a PDSCH, a PHICH, and/or a PBCH may be (repeatedly) received according to any one of embodiments A to G of the present invention. The UE processor may control the UE RF unit so that a PUCCH and/or a PUSCH may be (repeatedly) transmitted according to any one of embodiments A to G of the present invention. The UE processor may (combine and) decode the repeatedly received PDCCH and/or PDSCH. The UE processor may generate ACK/NACK information according to whether decoding has successfully been performed and control the UE RF unit so that the ACK/NACK information may be transmitted through the PUCCH and/or the PUSCH. The UE processor may control the UE RF unit so as to perform repetitive transmission of the PUCCH and/or the PUSCH. The UE processor may control the UE RF unit so that configuration information of a subframe bundle (e.g. a transmission period, a transmission offset, a start frame, a bundle size, and/or a number of repetitions) may be received for repetitive transmission of the PDCCH, PDSCH, PUCCH, PUSCH, PHICH and/or PBCH. The UE processor may control the UE RF unit so that (repetitive) transmission/reception of a corresponding physical channel may be performed in a corresponding bundle based on the configuration information.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to an eNB, a UE, or other devices in a wireless communication system.

What is claimed is:

1. A method for receiving, by a user equipment, downlink signals in a wireless communication system, the method comprising:
repeatedly receiving, by the user equipment, a physical downlink control channel, PDCCH, multiple times across N consecutive time intervals, where N is an integer greater than 1; and
repeatedly receiving, by the user equipment based on the PDCCH, a physical downlink shared channel, PDSCH, multiple times across D consecutive time intervals starting from a time interval n+k after a time interval n where the PDCCH is last received, where D is a positive integer,
wherein k is an integer greater than 1.

2. The method according to claim 1, further comprising:
receiving, by the user equipment, a higher layer signal including information regarding a maximum number of repetitions for the PDCCH,
wherein N is less than or equal to the maximum number of repetitions for the PDCCH.

3. The method according to claim 1, further comprising:
receiving, by the user equipment, information regarding a start of the N consecutive time intervals.

4. The method according to claim 1,
wherein the repeatedly received PDCCH is received using a same control channel element, CCE, resource within the N consecutive time intervals.

5. The method according to claim 1,
wherein each time interval consists of 14 orthogonal frequency division multiplexing, OFDM, symbols in a time domain.

6. A method for transmitting, by a base station, downlink signals in a wireless communication system, the method comprising:
repeatedly transmitting, by the base station, a physical downlink control channel, PDCCH, multiple times across N consecutive time intervals, where N is an integer greater than 1; and
repeatedly transmitting, by the base station based on the PDCCH, a physical downlink shared channel, PDSCH, multiple times across D consecutive time intervals starting from a time interval n+k after a time interval n where the PDCCH is last transmitted, where D is a positive integer,
wherein k is an integer greater than 1.

7. The method according to claim 6, further comprising:
transmitting, by the base station, a higher layer signal including information regarding a maximum number of repetitions for the PDCCH,
wherein N is less than or equal to the maximum number of repetitions for the PDCCH.

8. The method according to claim 6, further comprising:
transmitting, by the base station, information regarding a start of the N consecutive time intervals.

9. The method according to claim 6,
wherein the repeatedly transmitted PDCCH is transmitted using a same control channel element, CCE, resource within the N consecutive time intervals.

10. The method according to claim 6,
wherein each time interval consists of 14 orthogonal frequency division multiplexing, OFDM, symbols in a time domain.

11. A user equipment for receiving downlink signals in a wireless communication system, the user equipment comprising:
a transceiver, and
a processor configured to control the transceiver to:
repeatedly receive a physical downlink control channel, PDCCH, multiple times across N consecutive time intervals, where N is an integer greater than 1; and
repeatedly receive, based on the PDCCH, a physical downlink shared channel, PDSCH, multiple times across D consecutive time intervals starting from a time interval n+k after a time interval n where the PDCCH is last received, where D is a positive integer,
wherein k is an integer greater than 1.

12. The user equipment according to claim 11,
wherein the processor is configured to control the transceiver to receive a higher layer signal including information regarding a maximum number of repetitions for the PDCCH,
wherein N is less than or equal to the maximum number of repetitions for the PDCCH.

13. The user equipment according to claim 11,
wherein the processor is configured to control the transceiver to receive information regarding a start of the N consecutive time intervals.

14. The user equipment according to claim 11,
wherein the repeatedly received PDCCH is received using a same control channel element, CCE, resource within the N consecutive time intervals.

15. The user equipment according to claim 11,
wherein each time interval consists of 14 orthogonal frequency division multiplexing, OFDM, symbols in a time domain.

16. A base station for transmitting downlink signals in a wireless communication system, the base station comprising:
a transceiver, and
a processor configured to control the transceiver to:
repeatedly transmit a physical downlink control channel, PDCCH, across N consecutive time intervals, where N is an integer greater than 1; and
repeatedly transmit, based on the PDCCH, a physical downlink shared channel, PDSCH, multiple times across D consecutive time intervals starting from a time interval n+k after a time interval n where the PDCCH is last transmitted, where D is a positive integer,
wherein k is an integer greater than 1.

17. The base station according to claim 16,
wherein the processor is configured to control the transceiver to transmit a higher layer signal including information regarding a maximum number of repetitions for the PDCCH,
wherein N is less than or equal to the maximum number of repetitions for the PDCCH.

18. The base station according to claim 16,
wherein the processor is configured to control the transceiver to transmit information regarding a start of the N consecutive time intervals.

19. The base station according to claim 16,
wherein the repeatedly transmitted PDCCH is transmitted using a same control channel element, CCE, resource within the N consecutive time intervals.

20. The base station according to claim 16,
wherein each time interval consists of 14 orthogonal frequency division multiplexing, OFDM, symbols in a time domain.

* * * * *